United States Patent
Jiang et al.

(10) Patent No.: US 12,546,868 B2
(45) Date of Patent: Feb. 10, 2026

(54) RANGING METHOD AND APPARATUS BASED ON DETECTION SIGNAL

(71) Applicant: Shenzhen Yinwang Intelligent Technologies Co., Ltd., Shenzhen (CN)

(72) Inventors: Tong Jiang, Beijing (CN); Qiang Li, Beijing (CN); Hongying Wu, Beijing (CN); Honglei Li, Beijing (CN); Qiang Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 1170 days.

(21) Appl. No.: 17/486,946

(22) Filed: Sep. 28, 2021

(65) Prior Publication Data

US 2022/0011414 A1     Jan. 13, 2022

Related U.S. Application Data

(63) Continuation of application No. PCT/CN2019/080678, filed on Mar. 29, 2019.

(51) Int. Cl.
*G01S 7/4865* (2020.01)
*G01S 7/481* (2006.01)
(Continued)

(52) U.S. Cl.
CPC .......... *G01S 7/4865* (2013.01); *G01S 7/4814* (2013.01); *G01S 17/10* (2013.01); *G01S 17/931* (2020.01)

(58) Field of Classification Search
CPC ...... G01S 7/4865; G01S 7/4814; G01S 7/487; G01S 7/4873; G01S 7/486; G01S 17/931; G01S 17/10
See application file for complete search history.

(56) References Cited

U.S. PATENT DOCUMENTS 9,304,154 B1 *  4/2016  Droz ................... G01R 19/04
11,092,674 B2 * 8/2021  Warke ................. G01S 7/4915
(Continued)

FOREIGN PATENT DOCUMENTS

CA    2857826 A1    7/2009
CN    101001363 A   7/2007
(Continued)

OTHER PUBLICATIONS

Suzuki et al., "Sensing Technologies to Support Safe Automated Driving Systems," Toshiba Review [online], vol. 73, No. 6, total 7 pages (Nov. 26, 2018). With an English abstract.

*Primary Examiner* — Yuqing Xiao
*Assistant Examiner* — Isabelle Lin Boegholm
(74) *Attorney, Agent, or Firm* — Leydig, Voit & Mayer, Ltd.

(57) ABSTRACT

A ranging method and apparatus are provided. The method includes processing, by a ranging device, an echo signal of a detection signal based on a time-to-digital conversion ranging manner to determine a first data set. The echo signal is processed based on an analog-to-digital conversion ranging manner to determine a second data set. An output distance set is determined based on at least one parameter in the first data set or the second data set, and one or more of the following relationships: a relationship between at least one of an actual transmit power of the detection signal and a preset power threshold, a relationship between at least one estimated distance and a preset distance threshold, or a relationship between at least one signal parameter of the echo signal and a preset parameter threshold.

19 Claims, 8 Drawing Sheets

(51) Int. Cl.
G01S 17/10 (2020.01)
G01S 17/931 (2020.01)

(56) References Cited

U.S. PATENT DOCUMENTS

| | | |
|---|---|---|
| 2009/0262330 A1 | 10/2009 | Siercks |
| 2017/0090019 A1 | 3/2017 | Slobodyanyuk et al. |
| 2017/0242105 A1 | 8/2017 | Dussan et al. |
| 2018/0045816 A1 | 2/2018 | Jarosinski et al. |
| 2018/0203102 A1 | 7/2018 | Wang et al. |
| 2018/0356502 A1 | 12/2018 | Hinderling et al. |
| 2019/0063914 A1 | 2/2019 | Mayer et al. |
| 2020/0209356 A1* | 7/2020 | Lu .................. G01S 7/4861 |
| 2020/0217959 A1* | 7/2020 | Hall .................. G01S 17/02 |

FOREIGN PATENT DOCUMENTS

| | | |
|---|---|---|
| CN | 101490579 A | 7/2009 |
| CN | 106199622 A | 12/2016 |
| CN | 107589425 A | 1/2018 |
| CN | 108139481 A | 6/2018 |
| CN | 108732553 A | 11/2018 |
| FR | 2858062 A1 | 1/2005 |
| IN | 101005689 A | 7/2007 |
| JP | H11352237 A | 12/1999 |
| JP | 2011505545 A | 2/2011 |
| JP | 2012122951 A | 6/2012 |
| JP | 2014228304 A | 12/2014 |
| JP | 2018528437 A | 9/2018 |
| WO | 2009042805 A1 | 4/2009 |

* cited by examiner

RANGING METHOD AND APPARATUS BASED ON DETECTION SIGNAL

CROSS-REFERENCE TO RELATED APPLICATIONS

This application is a continuation of International Application No. PCT/CN2019/080678, filed on Mar. 29, 2019, the disclosure of which is hereby incorporated by reference in its entirety.

TECHNICAL FIELD

This application relates to the field of distance detection technologies, and in particular, to a ranging method and apparatus based on a detection signal.

BACKGROUND

A LiDAR (Light Detection and Ranging, LiDAR) is a radar system that emits a laser beam to detect feature quantities of a target object, such as a position and a speed. A working principle of the LiDAR is to transmit a laser detection signal to the target object, then compare a received signal that is reflected from the target object with the transmitted detection signal, and perform signal processing, to obtain information about the target object, for example, parameters such as a target distance, an azimuth, a height, a speed, a posture, and even a shape. The LiDAR has high measurement accuracy and fine temporal and spatial resolution, and can implement functions such as ranging, target detection, tracking, and imaging recognition. Ranging is a basic function of the LiDAR.

Currently, most LiDARs use a pulsed light time of flight (Time of flight, ToF) principle to measure a distance, and can detect distances from several meters to several kilometers. The principle is as follows: A laser emits a light pulse that lasts a very short time period; a light transmission time period in which the light pulse reaches a target object from a LiDAR and then is reflected to a rangefinder from the target object is measured, where the light transmission time period is also referred to as a time of flight t; a distance to the target object is calculated by using a formula $R=c \times t/(2 \times n)$, where c is the speed of light and is about 299792458 m/s, and n is a refractive index in a medium. Usually, there are two ToF ranging manners: a time-to-digital conversion (Time-to-Digital Converter, TDC)-based ranging manner and an analog-to-digital conversion (Analog-to-Digital Converter, ADC)-based ranging manner. The TDC ranging manner is a ranging manner based on an analog signal. Specifically, a time discrimination circuit is used to determine a moment at which an echo signal formed after a detection signal is reflected by a target is received, to obtain a time of flight of the detection signal, and the time of flight is converted into a corresponding distance. The ADC ranging manner is a ranging manner based on a digital signal. Specifically, analog-to-digital conversion is performed on an echo signal formed by reflecting a detection signal, and signal processing is performed on a digital signal, to obtain a detected distance.

In the foregoing two manners, although TDC measurement accuracy is relatively high in the TDC-based ranging manner, ranging performance is limited by time discrimination accuracy; although performance of an echo with a low signal-to-noise ratio can be improved through digital-domain signal processing in the ADC-based ranging manner, ranging performance is limited by a sampling rate. Consequently, during actual application, when either of the foregoing two ranging manners is independently used, there are a plurality of limitation factors, and the ranging performance is affected.

SUMMARY

Embodiments of this application provide a ranging method and apparatus based on a detection signal, to improve ranging precision and ranging accuracy.

To achieve the foregoing objective, the following technical solutions are used in the embodiments of this application.

According to a first aspect, a ranging method based on a detection signal is provided, where a signal formed by reflecting the detection signal is an echo signal. The method includes: processing the echo signal based on a time-to-digital conversion TDC ranging manner, to determine a first data set, where the first data set includes at least one first distance or at least one first time of flight; processing the echo signal based on an analog-to-digital conversion ADC ranging manner, to determine a second data set, where the second data set includes at least one second distance or at least one second time of flight; and determining at least one piece of data in the first data set or the second data set as an output distance set based on a relationship between each of at least one of an actual transmit power of the detection signal, at least one to-be-measured distance, or at least one signal parameter of the echo signal and a preset threshold.

In the foregoing technical solution, ranging is separately performed in the TDC ranging manner and the ADC ranging manner, and an ADC ranging result or an ADC ranging result is flexibly selected from two ranging results by using a specific policy and is output, that is, a better ranging result is selected and output. Therefore, accuracy of the output distance set and ranging precision can be improved.

In a possible implementation of the first aspect, the determining an output distance set based on at least one parameter in the first data set or the second data set includes at least one of the following methods: determining the at least one first distance as the output distance set; separately calculating at least one third distance based on the at least one first time of flight, and determining the at least one third distance as the output distance set; determining the at least one second distance as the output distance set; or separately calculating at least one fourth distance based on the at least one second time of flight, and determining the at least one fourth distance as the output distance set. In the foregoing possible implementation, a plurality of different manners of selecting the output distance set are provided. This can improve selection flexibility and diversity.

In a possible implementation of the first aspect, the determining an output distance set based on at least one parameter in the first data set or the second data set, and a relationship between each of at least one of an actual transmit power of the detection signal, at least one estimated distance, or at least one signal parameter of the echo signal and a preset threshold includes at least one of the following: when determining that the actual transmit power is greater than or equal to a preset power threshold, determining the first data set as the output distance set; or when determining that the actual transmit power is less than a preset power threshold, determining the second data set as the output distance set. In the foregoing possible implementation, based on a relationship between the actual transmit power and the preset power threshold, it can be ensured that accuracy of the output distance set is maximum, thereby improving ranging precision and ranging accuracy.

In a possible implementation of the first aspect, the determining an output distance set based on at least one parameter in the first data set or the second data set, and a relationship between each of at least one of an actual transmit power of the detection signal, at least one estimated distance, or at least one signal parameter of the echo signal and a preset threshold includes at least one of the following: when determining that the actual transmit power is greater than or equal to a preset power threshold, determining the first data set as the output distance set; after determining that the actual transmit power is less than a preset power threshold, when determining that the at least one estimated distance is less than or equal to a preset distance threshold, determining the first data set as the output distance set; or after determining that the actual transmit power is less than a preset power threshold, when determining that the at least one estimated distance is greater than a preset distance threshold, determining the second data set as the output distance set. In the foregoing possible implementation, based on a relationship between the actual transmit power and the preset power threshold and a relationship between the estimated distance and the preset distance threshold, it can be ensured that accuracy of the output distance set is maximum, thereby improving ranging precision and ranging accuracy.

In a possible implementation of the first aspect, the determining an output distance set based on at least one parameter in the first data set or the second data set, and a relationship between each of at least one of an actual transmit power of the detection signal, at least one estimated distance, or at least one signal parameter of the echo signal and a preset threshold includes at least one of the following: when determining that the at least one estimated distance is less than or equal to a preset distance threshold, determining the first data set as the output distance set; or when determining that the at least one estimated distance is greater than a preset distance threshold, determining the second data set as the output distance set. In the foregoing possible implementation, based on a relationship between the estimated distance and the preset distance threshold, it can be ensured that accuracy of the output distance set is maximum, thereby improving ranging precision and ranging accuracy.

In a possible implementation of the first aspect, the determining an output distance set based on at least one parameter in the first data set or the second data set, and a relationship between each of at least one of an actual transmit power of the detection signal, at least one estimated distance, or at least one signal parameter of the echo signal and a preset threshold includes at least one of the following: after determining that the at least one estimated distance is less than or equal to a preset distance threshold, when determining that the actual transmit power of the detection signal is less than a preset power threshold, determining the first data set as the output distance set; or after determining that the at least one estimated distance is greater than a preset distance threshold, when determining that the actual transmit power of the detection signal is less than a preset power threshold, determining the second data set as the output distance set. In the foregoing possible implementation, based on a relationship between the estimated distance and the preset distance threshold and a relationship between the actual transmit power and the preset power threshold, it can be ensured that accuracy of the output distance set is maximum, thereby improving ranging precision and ranging accuracy.

In a possible implementation of the first aspect, the at least one estimated distance is in a one-to-one correspondence with a parameter in the first data set, and is in a one-to-one correspondence with a parameter in the second data set, and the determining an output distance set based on at least one parameter in the first data set or the second data set, and a relationship between each of at least one of an actual transmit power of the detection signal, at least one estimated distance, or at least one signal parameter of the echo signal and a preset threshold includes: determining at least one first estimated distance and at least one second estimated distance in the at least one estimated distance, where the at least one estimated distance is less than or equal to a preset distance threshold, and the at least one second estimated distance is greater than the preset distance threshold; and determining a parameter that is in the first data set and that corresponds to the at least one first estimated distance and a parameter that is in the second data set and that corresponds to the at least one second estimated distance as the output distance set. In the foregoing possible implementation, it can be ensured that accuracy of the output distance set is maximum, thereby improving ranging precision and ranging accuracy.

In a possible implementation of the first aspect, the at least one signal parameter is any one of the following parameters: an amplitude, energy, or a signal-to-noise ratio, and the determining an output distance set based on at least one parameter in the first data set or the second data set, and a relationship between each of at least one of an actual transmit power of the detection signal, at least one estimated distance, or at least one signal parameter of the echo signal and a preset threshold includes at least one of the following: when determining that the at least one signal parameter is less than or equal to a preset parameter threshold, determining the first data set as the output distance set; or when determining that the at least one signal parameter is greater than a preset parameter threshold, determining the second data set as the output distance set. In the foregoing possible implementation, through comparison between the signal parameter of the echo signal and the preset parameter threshold, it can be ensured that accuracy of the output distance set is maximum, thereby improving ranging precision and ranging accuracy.

In a possible implementation of the first aspect, the at least one signal parameter is any one of the following parameters: an amplitude, energy, or a signal-to-noise ratio, the at least one signal parameter is in a one-to-one correspondence with a parameter in the first data set, and is in a one-to-one correspondence with a parameter in the second data set, and the determining an output distance set based on at least one parameter in the first data set or the second data set, and a relationship between each of at least one of an actual transmit power of the detection signal, at least one estimated distance, or at least one signal parameter of the echo signal and a preset threshold includes: determining at least one first signal parameter and at least one second signal parameter in the at least one signal parameter, where the at least one first signal parameter is less than or equal to a preset parameter threshold, and the at least one second signal parameter is greater than the preset parameter threshold; and determining a parameter that is in the first data set and that corresponds to the at least one first signal parameter and a parameter that is in the second data set and that corresponds to the at least one second signal parameter as the output distance set. In the foregoing possible implementation, through comparison between the signal parameter of the echo signal and the preset parameter threshold, it can be ensured that accuracy of the output distance set is maximum, thereby improving ranging precision and ranging accuracy.

In a possible implementation of the first aspect, the at least one signal parameter includes any one of the following parameters: an amplitude, energy, or a signal-to-noise ratio, the at least one signal parameter is in a one-to-one correspondence with a parameter in the first data set, and is in a one-to-one correspondence with a parameter in the second data set, and the determining an output distance set based on at least one parameter in the first data set or the second data set, and a relationship between each of at least one of an actual transmit power of the detection signal, at least one estimated distance, or at least one signal parameter of the echo signal and a preset threshold includes: determining at least one first signal parameter and at least one second signal parameter in the at least one signal parameter, where both the at least one first signal parameter and the at least one second signal parameter are greater than a preset parameter threshold, and a data difference between two parameters that are in the second data set and that respectively correspond to the at least one first signal parameter and the at least one second signal parameter is less than or equal to a data difference threshold; and determining a parameter that is in the first data set and that corresponds to the at least one first signal parameter and a parameter that is in the second data set and that corresponds to the at least one second signal parameter as the output distance set. In the foregoing possible implementation, through comparison between the signal parameter of the echo signal and the preset parameter threshold, it can be ensured that accuracy of the output distance set is maximum, thereby improving ranging precision and ranging accuracy.

In a possible implementation of the first aspect, the second data set further includes a clutter location, and before the determining at least one parameter in the first data set or the second data set as an output distance set based on a relationship between each of at least one of an actual transmit power of the detection signal, at least one estimated distance, or at least one signal parameter of the echo signal and a preset threshold, the method further includes: deleting, based on the clutter location, a parameter that is in the first data set and that corresponds to the clutter location. In the foregoing possible implementation, inaccurate distance information in the first data set is deleted based on the clutter location, so that ranging accuracy can be further improved.

In a possible implementation of the first aspect, the second data set further includes a saturation echo location, and before the determining an output distance set based on at least one parameter in the first data set or the second data set, and a relationship between each of at least one of an actual transmit power of the detection signal, at least one estimated distance, or at least one signal parameter of the echo signal and a preset threshold, the method further includes: deleting, based on the saturation echo location, a parameter that is in the first data set and that corresponds to the saturation echo location. In the foregoing possible implementation, inaccurate distance information in the first data set is deleted based on the saturation echo location, so that ranging accuracy can be further improved.

According to a second aspect, a ranging apparatus based on a detection signal is provided, where a signal formed by reflecting the detection signal is an echo signal, and the ranging apparatus includes: a time-to-digital conversion (TDC) ranging unit, configured to process the echo signal based on a TDC ranging manner, to determine a first data set, where the first data set includes the following parameter: at least one first distance or at least one first time of flight; an analog-to-digital conversion (ADC) ranging unit, configured to process the echo signal based on an ADC ranging manner, to determine a second data set, where the second data set includes the following parameter: at least one second distance or at least one second time of flight; and a control unit, configured to determine an output distance set based on at least one parameter in the first data set or the second data set, and a relationship between each of at least one of an actual transmit power of the detection signal, at least one estimated distance, or at least one signal parameter of the echo signal and a preset threshold.

In a possible implementation of the second aspect, the control unit is specifically configured to perform at least one of the following steps: determining the at least one first distance as the output distance set; separately calculating at least one third distance based on the at least one first time of flight, and determining the at least one third distance as the output distance set; determining the at least one second distance as the output distance set; or separately calculating at least one fourth distance based on the at least one second time of flight, and determining the at least one fourth distance as the output distance set.

In a possible implementation of the second aspect, the control unit is specifically configured to: when determining that the actual transmit power is greater than or equal to a preset power threshold, determine the first data set as the output distance set; or when determining that the actual transmit power is less than a preset power threshold, determine the second data set as the output distance set.

In a possible implementation of the second aspect, the control unit is specifically configured to: when determining that the actual transmit power is greater than or equal to a preset power threshold, determine the first data set as the output distance set; after determining that the actual transmit power is less than a preset power threshold, when determining that the at least one estimated distance is less than or equal to a preset distance threshold, determine the first data set as the output distance set; or after determining that the actual transmit power is less than a preset power threshold, when determining that the at least one estimated distance is greater than a preset distance threshold, determine the second data set as the output distance set.

In a possible implementation of the second aspect, the control unit is specifically configured to: when determining that the at least one estimated distance is less than or equal to a preset distance threshold, determine the first data set as the output distance set; or when determining that the at least one estimated distance is greater than a preset distance threshold, determine the second data set as the output distance set.

In a possible implementation of the second aspect, the control unit is specifically configured to: after determining that the at least one estimated distance is less than or equal to a preset distance threshold, when determining that the actual transmit power of the detection signal is less than a preset power threshold, determine the first data set as the output distance set; or after determining that the at least one estimated distance is greater than a preset distance threshold, when determining that the actual transmit power of the detection signal is less than a preset power threshold, determine the second data set as the output distance set.

In a possible implementation of the second aspect, the control unit is specifically configured to: determine at least one first estimated distance and at least one second estimated distance in the at least one estimated distance, where the at least one first estimated distance is less than or equal to a preset distance threshold, and the at least one second estimated distance is greater than the preset distance threshold; and determine a parameter that is in the first data set and that corresponds to the at least one first estimated distance and a parameter that is in the second data set and that corresponds to the at least one second estimated distance as the output distance set, where the at least one estimated distance is in a one-to-one correspondence with the parameter in the first data set, and is in a one-to-one correspondence with the parameter in the second data set.

In a possible implementation of the second aspect, the control unit is specifically configured to: when determining that the at least one signal parameter is less than or equal to a preset parameter threshold, determine the first data set as the output distance set; or when determining that the at least one signal parameter is greater than a preset parameter threshold, determine the second data set as the output distance set, where the at least one signal parameter is any one of the following parameters: an amplitude, energy, or a signal-to-noise ratio.

In a possible implementation of the second aspect, the control unit is specifically configured to: determine at least one first signal parameter and at least one second signal parameter in the at least one signal parameter, where the at least one first signal parameter is less than or equal to a preset parameter threshold, and the at least one second signal parameter is greater than the preset parameter threshold; and determine a parameter that is in the first data set and that corresponds to the at least one first signal parameter and a parameter that is in the second data set and that corresponds to the at least one second signal parameter as the output distance set, where the at least one signal parameter is any one of the following parameters: an amplitude, energy, or a signal-to-noise ratio, and the at least one signal parameter is in a one-to-one correspondence with the parameter in the first data set, and is in a one-to-one correspondence with the parameter in the second data set.

In a possible implementation of the second aspect, the control unit is specifically configured to: determine a first signal parameter and a second signal parameter in the at least one signal parameter, where both the at least one first signal parameter and the at least one second signal parameter are greater than a preset parameter threshold, and a data difference between two parameters that are in the second data set and that respectively correspond to the at least one first signal parameter and the at least one second signal parameter is less than or equal to a data difference threshold; and determine two pieces of data that are in the first data set and that respectively correspond to the at least one first signal parameter and the at least one second signal parameter in the second data set as the output distance set, where the at least one signal parameter includes any one of the following parameters: an amplitude, energy, or a signal-to-noise ratio, and the at least one signal parameter is in a one-to-one correspondence with the parameter in the first data set, and is in a one-to-one correspondence with the parameter in the second data set.

In a possible implementation of the second aspect, the second data set further includes a clutter location. The control unit is further configured to delete, based on the clutter location, a parameter that is in the first data set and that corresponds to the clutter location.

In a possible implementation of the second aspect, the second data set further includes a saturation echo location. The control unit is further configured to delete, based on the saturation echo location, a parameter that is in the first data set and that corresponds to the saturation echo location.

In a possible implementation of the second aspect, the control unit is further configured to enable or disable the TDC ranging unit and the ADC ranging unit. In the foregoing possible implementation, different ranging units are enabled or disabled, so that a ranging unit with highest accuracy is selected to perform ranging. This can improve ranging precision and accuracy, and reduce energy consumption of the ranging system.

In a possible implementation of the second aspect, the control unit is further specifically configured to: when determining that the actual transmit power of the detection signal is greater than or equal to the preset power threshold, enable the TDC ranging unit; or when determining that the actual transmit power of the detection signal is less than the preset power threshold, enable the ADC ranging unit. In the foregoing possible implementation, different ranging units are enabled or disabled, so that a ranging unit with highest accuracy is selected to perform ranging. This can improve ranging precision and accuracy, and reduce energy consumption of the ranging system.

In a possible implementation of the second aspect, the control unit is further configured to: when determining that the ADC ranging unit is faulty, enable the TDC ranging unit; or when determining that the TDC ranging unit is faulty, enable the ADC ranging unit. In the foregoing possible implementation, when a ranging unit is faulty, another ranging unit is enabled to perform ranging, so that robustness and ranging performance of the ranging system can be improved.

In a possible implementation of the second aspect, the control unit is further configured to: configure a first measurement parameter of the TDC ranging unit, where the first measurement parameter includes the first distance or the first time of flight; and configure a second measurement parameter of the ADC ranging unit, where the second measurement parameter includes the second distance or the second time of flight. In the foregoing possible implementation, the control unit may configure measurement parameters for the TDC ranging unit and the ADC ranging unit based on requirements, so that flexibility and ranging performance of the ranging system can be improved.

In a possible implementation of the second aspect, the first measurement parameter further includes at least one of the following parameters: an amplitude, energy, or a signal-to-noise ratio; and the second measurement parameter further includes at least one of the following parameters: an amplitude, energy, a signal-to-noise ratio, a clutter location, or a saturation echo location. In the foregoing possible implementation, the control unit may further configure another measurement parameter for the ADC ranging unit based on requirements, so that ranging performance of the ranging system can be further improved.

According to a third aspect, a ranging apparatus based on a detection signal is provided. The apparatus includes a processor and a memory. The memory stores instructions, and when the processor runs the stored instructions, the apparatus is enabled to perform the ranging method based on a detection signal in any one of the first aspect or the possible implementations of the first aspect.

According to a fourth aspect, a computer storage medium is provided. The computer-readable storage medium stores instructions. When the instructions are run on a computer, the computer is enabled to perform the ranging method based on a detection signal in any one of the first aspect or the possible implementations of the first aspect.

According to a fifth aspect, a mobile platform is provided. The mobile platform includes a detection signal transmitter, a detection signal receiver, and the ranging apparatus based on a detection signal in any one of the second aspect or the possible implementations of the second aspect.

It may be understood that any one of the ranging apparatus based on a detection signal, the readable storage medium, the computer program product, and the mobile platform that are provided above can be implemented by using the corresponding method provided above.

Therefore, for beneficial effects that can be achieved, refer to beneficial effects in the corresponding method provided above. Details are not described herein again.

DESCRIPTION OF EMBODIMENTS

Figure 1:
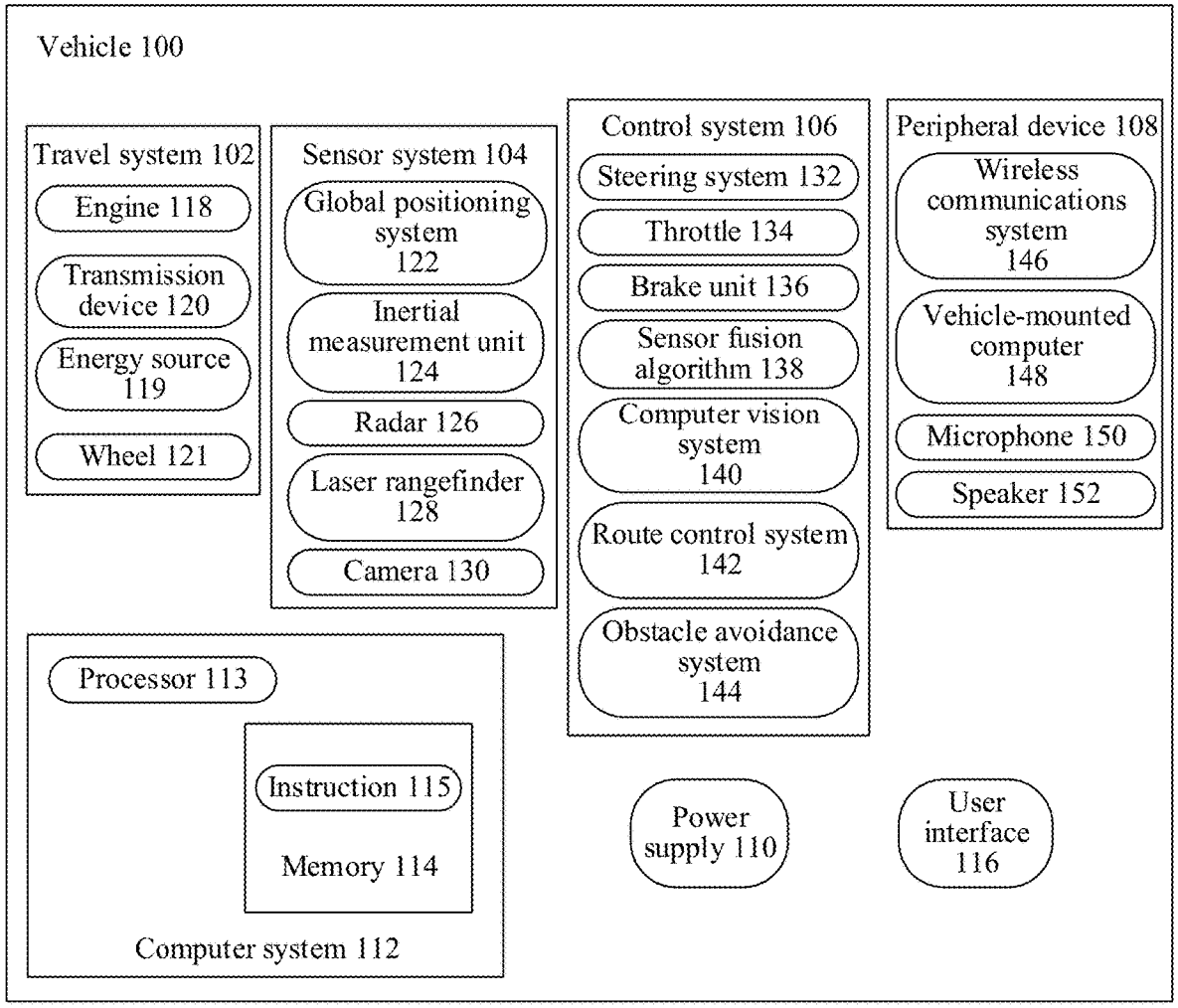
FIG. 1 is a schematic structural diagram of a vehicle with an autonomous driving function according to an embodiment of this application.

FIG. 1 is a functional block diagram of a vehicle 100 with an autonomous driving function according to an embodiment of this application. In an embodiment, the vehicle 100 is configured to be in a fully or partially autonomous driving mode. For example, the vehicle 100 may control the vehicle 100 in an autonomous driving mode, determine current statuses of the vehicle and an ambient environment of the vehicle through a manual operation, determine possible behavior of at least one other vehicle in the ambient environment, determine a confidence level corresponding to a possibility of performing the possible behavior by the another vehicle, and control the vehicle 100 based on determined information. When the vehicle 100 is in the autonomous driving mode, the vehicle 100 may be set to operate without interacting with a person.

The vehicle 100 may include various subsystems, such as a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, the subsystems and the elements of the vehicle 100 may be interconnected in a wired or wireless manner.

The travel system 102 may include a component that provides power for the vehicle 100 to move. In an embodiment, the travel system 102 may include an engine 118, an energy source 119, a transmission device 120, and a wheel/tire 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed-gas-based fuels, ethanol, solar panels, batteries, and other power sources. The energy source 119 may also provide energy for another system of the vehicle 100.

The transmission device 120 may transmit mechanical power from the engine 118 to the wheel 121. The transmission device 120 may include a gearbox, a differential, and a drive shaft. In an embodiment, the transmission device 120 may further include another component, for example, a clutch. The drive shaft may include one or more shafts that may be coupled to one or more wheels 121.

The sensor system 104 may include several sensors that sense information about the ambient environment of the vehicle 100. For example, the sensor system 104 may include a positioning system 122 (the positioning system may be a global positioning system (global positioning system, GPS), a BeiDou system, or another positioning system), an inertial measurement unit (inertial measurement unit, IMU) 124, a radar 126, a laser rangefinder 128, and a camera 130. The sensor system 104 may further include sensors (for example, an in-vehicle air quality monitor, a fuel gauge, and an oil temperature gauge) of an internal system of the monitored vehicle 100. One or more pieces of sensor data from these sensors may be used to detect objects and corresponding features (a location, a shape, a direction, a speed, and the like) of the objects. Such detection and recognition are key functions of safe operations of the autonomous vehicle 100.

The positioning system 122 may be configured to estimate a geographical location of the vehicle 100. The IMU 124 is configured to sense location and orientation changes of the vehicle 100 based on inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing the object, the radar 126 may be further configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and other system components.

The camera 130 may be configured to capture a plurality of images of the ambient environment of the vehicle 100. The camera 130 may be a still camera or a video camera.

The control system 106 controls operations of the vehicle 100 and components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 may operate to adjust a moving direction of the vehicle 100, and for example, may be a steering wheel system in an embodiment.

The throttle 134 is configured to control an operating speed of the engine 118 and further control a speed of the vehicle 100.

The brake unit 136 is configured to control the vehicle 100 to decelerate. The brake unit 136 may use friction to reduce a rotational speed of the wheel 121. In another embodiment, the brake unit 136 may convert kinetic energy of the wheel 121 into a current. The brake unit 136 may alternatively use another form to reduce a rotational speed of the wheel 121, to control the speed of the vehicle 100.

The computer vision system 140 may operate to process and analyze an image captured by the camera 130 to recognize objects and/or features in the ambient environment of the vehicle 100. The objects and/or features may include traffic signals, road boundaries, and obstacles. The computer vision system 140 may use an object recognition algorithm, a structure from motion (structure from motion, SFM) algorithm, video tracking, and another computer vision technology. In some embodiments, the computer vision system 140 may be configured to: draw a map for an environment, track an object, estimate a speed of the object, and the like.

The route control system 142 is configured to determine a driving route of the vehicle 100. In some embodiments, the route control system 142 may determine the driving route for the vehicle 100 in combination with data from the sensor 138, the GPS 122, and one or more predetermined maps.

The obstacle avoidance system 144 is configured to recognize, evaluate, and avoid or otherwise bypass a potential obstacle in an environment of the vehicle 100.

Certainly, in an instance, the control system 106 may additionally or alternatively include components other than those shown and described, or some of the components shown above may be reduced.

The vehicle 100 interacts with an external sensor, another vehicle, another computer system, or a user by using the peripheral device 108. The peripheral device 108 may include a wireless communications system 116, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The vehicle-mounted computer 148 may also be operated through the user interface 116 to receive a user input. The vehicle-mounted computer 148 can be operated through a touchscreen. In another case, the peripheral device 108 may provide a means for the vehicle 100 to communicate with another device located in the vehicle 100. For example, the microphone 150 can receive audio (for example, a voice command or another audio input) from the user of the vehicle 100. Similarly, the speaker 152 may output audio to the user of the vehicle 100.

The wireless communications system 116 may wirelessly communicate with one or more devices directly or through a communications network. For example, the wireless communications system 116 may use 3G cellular communications such as code division multiple access (code division multiple access, CDMA), EVDO, a global system for mobile communications (global system for mobile communications, GSM)/a general packet radio service (general packet radio service, GPRS), or 4G cellular communications such as long term evolution (long term evolution, LTE), or 5G cellular communications. The wireless communications system 116 may communicate with a wireless local area network (wireless local area network, WLAN) by using Wi-Fi. In some embodiments, the wireless communications system 116 may communicate directly with a device through an infrared link, Bluetooth, or ZigBee. Other wireless protocols, for example, various vehicle communications systems, such as the wireless communications system 116, may include one or more dedicated short-range communications (dedicated short-range communications, DSRC) devices, and these devices may include public and/or private data communications between the vehicle and/or roadside stations.

The power supply 110 may supply power to various components of the vehicle 100. In an embodiment, the power supply 110 may be a rechargeable lithium-ion or lead-acid battery. One or more battery packs of such a battery may be configured as a power supply to supply power to the components of the vehicle 100. In some embodiments, the power supply 110 and the energy source 119 may be implemented together, as in some pure electric vehicles.

Some or all functions of the vehicle 100 are controlled by the computer system 112. The computer system 112 may include at least one processor 113. The processor 113 executes an instruction 115 stored in a non-transitory computer-readable medium such as a memory 114. The computer system 112 may alternatively be a plurality of computing devices that control an individual component or a subsystem of the vehicle 100 in a distributed manner.

The processor 113 may be any conventional processor such as a commercially available central processing unit (central processing unit, CPU). Alternatively, the processor may be a dedicated device such as an application-specific integrated circuit (application-specific integrated circuit, ASIC) or another hardware-based processor. Although FIG. 1 functionally illustrates the processor, the memory, and other elements of the computer 110 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer 110. Thus, it is understood that references to the processor or the computer include references to a set of processors or computers or memories that may or may not operate in parallel. Different from using a single processor to perform the steps described herein, some components such as a steering component and a deceleration component each may include a respective processor. The processor performs only computation related to a component-specific function.

In various aspects described herein, the processor may be located far away from the vehicle and perform wireless communication with the vehicle. In other aspects, some of the processes described herein are performed on the processor disposed inside the vehicle, while others are performed by a remote processor. The processes include necessary steps for performing a single operation.

In some embodiments, the memory 114 may include the instruction 115 (for example, program logic), and the instruction 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instruction 115, the memory 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

The user interface 116 is configured to provide information for or receive information from the user of the vehicle 100. Optionally, the user interface 116 may include one or more input/output devices in a set of peripheral devices 108, for example, the wireless communications system 116, the vehicle-mounted computer 148, the microphone 150, and the speaker 152.

The computer system 112 may control functions of the vehicle 100 based on inputs received from various subsystems (for example, the travel system 102, the sensor system 104, and the control system 106) and from the user interface 116. For example, the computer system 112 may use inputs from the control system 106 to control the steering unit 132 to avoid an obstacle detected by the sensor system 104 and the obstacle avoidance system 144. In some embodiments, the computer system 112 may operate to provide control over many aspects of the vehicle 100 and the subsystems of the vehicle 100.

Optionally, one or more of the foregoing components may be installed separately from or associated with the vehicle 100. For example, the memory 114 may be partially or completely separated from the vehicle 100. The foregoing components may be communicatively coupled together in a wired and/or wireless manner.

Optionally, the foregoing components are merely examples. In actual application, components in the foregoing modules may be added or removed based on actual requirements. FIG. 1 should not be understood as a limitation to this embodiment of this application.

An autonomous driving vehicle traveling on a road, such as the foregoing vehicle 100, may recognize an object in an ambient environment of the autonomous driving vehicle to determine adjustment on a current speed. The object may be another vehicle, a traffic control device, or another type of object. In some examples, each recognized object may be considered independently and may be used to determine the speed to be adjusted by the autonomous driving vehicle, based on features of each object, such as a current speed of the object, acceleration of the object, or a distance between the object and the vehicle.

Optionally, the autonomous driving vehicle 100 or a computing device (such as the computer system 112, the computer vision system 140, or the memory 114 in FIG. 1) associated with the autonomous driving vehicle 100 may predict behavior of the recognized object based on the feature of the recognized object and the status (for example, traffic, rain, or ice on a road) of the ambient environment. Optionally, recognized objects depend on mutual behavior. Therefore, all recognized objects may be considered together to predict behavior of a single recognized object. The vehicle 100 can adjust the speed of the vehicle 100 based on the predicted behavior of the recognized object. In other words, the autonomous driving vehicle can determine, based on the predicted behavior of the object, a stable state to which the vehicle needs to be adjusted (for example, through acceleration, deceleration, or stopping). In this process, other factors, for example, a transverse location of the vehicle 100 driven on a road, a curvature of the road, and proximity of a static object and a dynamic object, may also be considered to determine the speed of the vehicle 100.

In addition to providing an instruction for adjusting the speed of the autonomous driving vehicle, the computing device may further provide an instruction for modifying a steering angle of the vehicle 100, so that the autonomous driving vehicle can follow a given track and/or maintain a safe horizontal distance and a safe vertical distance from an object (for example, a car on a neighboring lane on the road) near the autonomous driving vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

After the vehicle 100 is described, the following describes ranging manners related to the radar 126, the laser rangefinder 128, and the like in the vehicle 100 in this application. First, a time-to-digital conversion (Time-to-Digital Converter, TDC) ranging manner and an analog-to-digital conversion (Analog-to-Digital Converter, ADC) ranging manner in this application are introduced and described.

Figure 2:
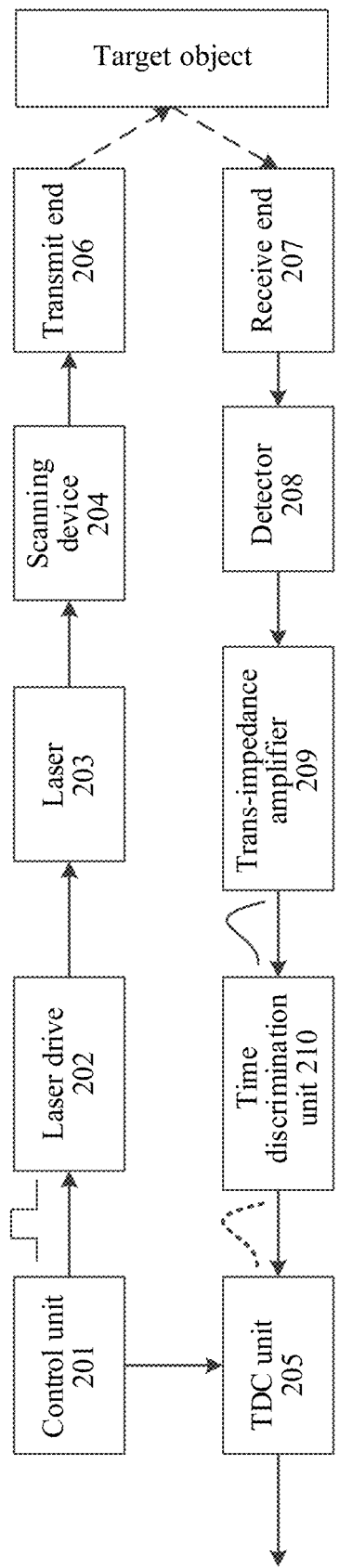
FIG. 2 is a schematic structural diagram of a TDC ranging system according to an embodiment of this application.

The TDC ranging manner is a ranging manner based on an analog signal. Specifically, a time of flight of a detection signal is obtained by using the detection signal and an echo signal that is formed by reflecting the detection signal, and the time of flight is converted into a corresponding distance, to obtain a detected distance. For example, FIG. 2 is a schematic structural diagram of a TDC ranging system. The TDC ranging system may include: a control unit 201, a laser drive 202, a laser 203, a scanning device 204, a time-to-digital conversion TDC unit 205, a transmit end 206, a receive end 207, a detector 208, a trans-impedance amplifier 209, and a time discrimination unit 210. The control unit 201 may be specifically a central processing unit, a general-purpose processor, a digital signal processor, an application-specific integrated circuit, a hardware component, or any combination thereof, and may implement or execute various example logical blocks, modules, and circuits described with reference to content disclosed in this application.

A ranging principle of the TDC ranging system may be as follows: The control unit 201 transmits a pulse signal to the laser drive circuit 202. The laser drive circuit 202 modulates the pulse signal and sends a modulated pulse signal to the laser 203. The laser 203 transmits a light pulse signal, and simultaneously, the control unit 201 sends a start signal to the TDC unit 205, where the start signal is used to determine a start moment at which the light pulse signal is sent. The scanning device 204 scans the light pulse signal. The transmit end 206 that may be a transmit-end optical component processes and transmits the light pulse signal. After the light pulse signal encounters an obstacle such as a target object, an echo signal is reflected to the receive end 207. The receive end 207 that may be a receive-end optical component focuses on and processes a received optical signal, and sends a processed optical signal to the detector 208. The detector 208 receives the optical signal and converts the optical signal into a current signal. The trans-impedance amplifier 209 can amplify the current signal into a voltage signal, and an end signal is output to the TDC unit 205 through the time discrimination unit 210, where the end signal is used to determine an end moment at which the light pulse signal is returned. The TDC unit 205 can obtain a time of flight by calculating a time difference between the end signal sent by the time discrimination unit 210 and the start signal sent by the control unit 201, and obtain a distance through calculation according to a calculation formula R=c× t/(2×n) of a time of flight and a distance, where c is the speed of light, and is about 299792458 m/s, and n is a refractive index in a medium. In this way, the distance is calculated.

Figure 3:
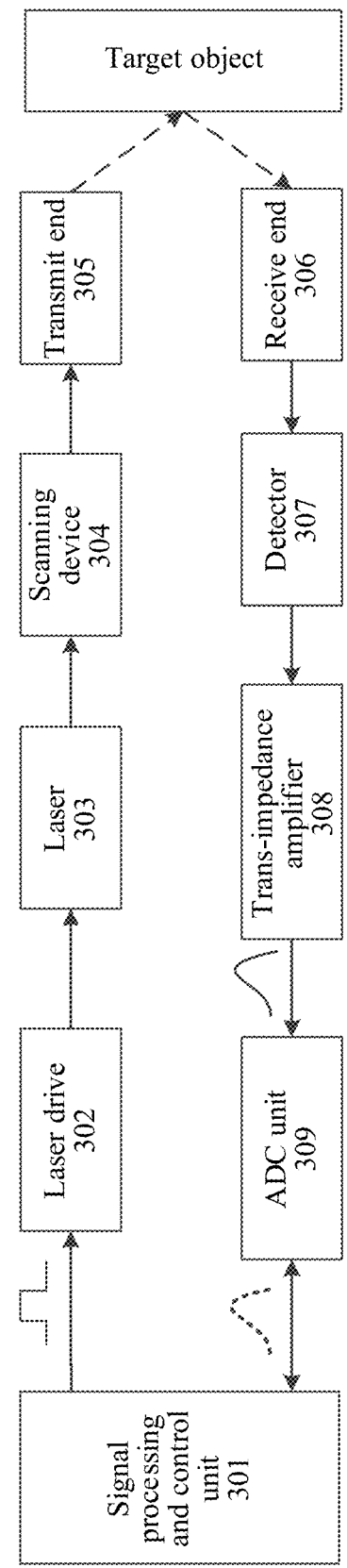
FIG. 3 is a schematic structural diagram of an ADC ranging system according to an embodiment of this application.

The ADC ranging manner is a ranging manner based on a digital signal. Specifically, analog-to-digital conversion is performed on an echo signal formed by reflecting a detection signal, and signal processing is performed on a digital signal, to obtain a detected distance. For example, FIG. 3 is a schematic structural diagram of an ADC ranging system. The ADC ranging system may include: a signal processing and control unit 301, a laser drive 302, a laser 303, a scanning device 304, a transmit end 305, a receive end 306, a detector 307, a trans-impedance amplifier 308, and an analog-to-digital conversion ADC unit 309. The signal processing and control unit 301 may be specifically a central processing unit, a general-purpose processor, a digital signal processor, an application-specific integrated circuit, a hardware component, or any combination thereof, and may implement or execute various example logical blocks, modules, and circuits described with reference to content disclosed in this application.

A ranging principle of the ADC ranging system may be as follows: The signal processing and control unit 301 transmits a pulse signal to the laser drive circuit 302. The laser drive circuit 302 modulates the pulse signal and sends a modulated pulse signal to the laser 303. The laser 303 transmits a light pulse signal, and the scanning device 304 scans the light pulse signal. The transmit end 305 that may be a transmit-end optical component processes and transmits the light pulse signal. After the light pulse signal encounters an obstacle such as a target object, an echo signal is reflected to the receive end 306. The receive end 306 that may be a receive-end optical component focuses on and processes a received optical signal, and sends a processed optical signal to the detector 307. The detector 307 receives the optical signal and converts the optical signal into a current signal. The trans-impedance amplifier 308 can amplify the current signal into a voltage signal. The ADC unit 309 can convert the analog voltage signal into a digital signal, and send the digital signal to the signal processing and control unit 301. The signal processing and control unit 301 perform calculation processing on the digital signal that is output by the ADC unit 309, to obtain a plurality of pieces of information of the echo signal, such as a distance, a gray scale, an estimated reflectivity value, an echo amplitude, energy, and a signal-to-noise ratio, that is, clutter information or saturation echo information.

It should be noted that, ranging accuracy of the TDC ranging manner is higher than ranging accuracy of the ADC ranging manner, but the ranging accuracy of the TDC ranging manner is related to accuracy of the time discrimination unit 210 in the TDC ranging system. Therefore, the TDC ranging manner is more suitable for measuring a distance of a relatively close target object. In the ADC ranging manner, a digital signal obtained through conversion can be processed by using a ranging algorithm, to improve performance of an echo with a low signal-to-noise ratio, and therefore, ranging accuracy is relatively high in a case of an echo signal with a low signal-to-noise ratio. However, a disadvantage of the ADC ranging manner is that its ranging accuracy is limited by a sampling rate. Therefore, when either of the two manners is used independently, ranging performance and accuracy are low.

Figure 4:
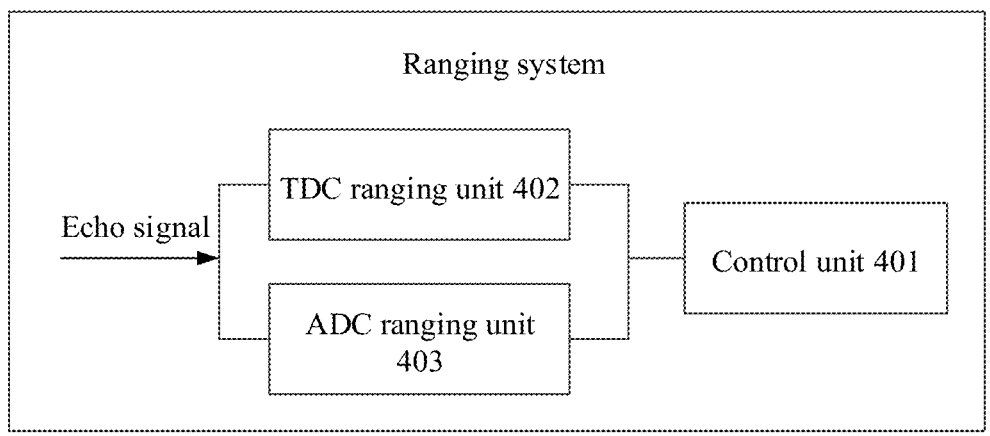
FIG. 4 is a first schematic structural diagram of a ranging system according to an embodiment of this application.

Based on this, the embodiments of this application provide a ranging method and a ranging apparatus, to improve performance and ranging accuracy of the ranging apparatus by combining the TDC ranging manner with the ADC ranging manner. FIG. 4 is a schematic structural diagram of a ranging system according to an embodiment of this application. The ranging system may include a control unit 401, a TDC ranging unit 402, and an ADC ranging unit 403. In addition, the ranging apparatus may further include a related unit configured to send a detection signal and a related unit configured to receive an echo signal of the detection signal, which are not shown in FIG. 4. For details, refer to related descriptions in FIG. 2 or FIG. 3. The control unit 401 may be specifically a central processing unit, a general-purpose processor, a digital signal processor, an application-specific integrated circuit, a hardware component, or any combination thereof, and may implement or execute various example logical blocks, modules, and circuits described with reference to content disclosed in this application.

In the ranging system, the TDC ranging unit 402 may be configured to perform ranging in a TDC ranging manner; the ADC ranging unit 403 may be configured to perform ranging in an ADC ranging manner; the control unit 401 may select, based on a ranging result that is output by the TDC ranging unit 402 and a ranging result that is output by the ADC ranging unit 403, a ranging result with highest output accuracy as a final measured distance. During actual application, the control unit 401 may be specifically a central processing unit (Central Processing Unit, CPU), a digital signal processor (Digital Signal Processor, DSP), an application-specific integrated circuit (Application-Specific Integrated Circuit, ASIC), or the like.

In addition, the control unit 401 may further filter, based on the ranging result of the ADC ranging unit 403, a ranging result that has a relatively large error or that corresponds to external noise in ranging results of the TDC ranging unit 402, for example, a clutter location and a saturation echo location. This implements complementation of advantages of the two ranging manners and improves ranging performance of the ranging system.

Figure 5:
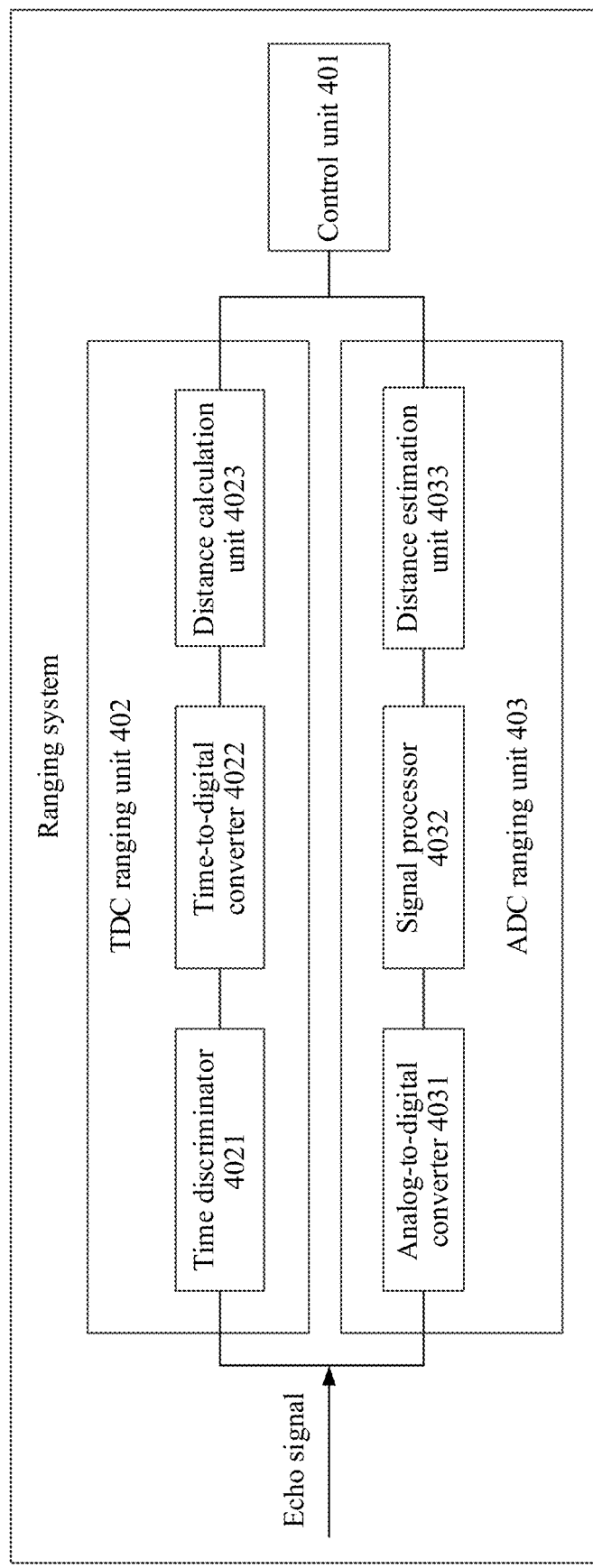
FIG. 5 is a second schematic structural diagram of a ranging system according to an embodiment of this application.

Further, as shown in FIG. 5, the TDC ranging unit 402 may include a time discriminator 4021, a time-to-digital converter 4022, and a distance calculation unit 4023. The time discriminator 4021 may be configured to perform time discrimination on the echo signal of the detection signal to obtain analog time information. The time-to-digital converter 4022 may be configured to convert the analog time information into digital time information. The distance calculation unit 4023 may be configured to obtain corresponding distance information through calculation based on the digital time information. The ADC ranging unit 403 may include an analog-to-digital converter 4031, a signal processor 4032, and a distance estimation unit 4033. The analog-to-digital converter 4031 is configured to perform analog-to-digital conversion on the echo signal of the detection signal to obtain a digital signal, and the signal processor 4032 is configured to perform a series of digitization processing on the digital signal to obtain digitized information of the echo signal. The distance estimation unit 4033 may be configured to obtain corresponding distance information through calculation based on the digitized information. Specifically, for detailed descriptions of ranging principles and specific circuits of the TDC ranging unit 402 and the ADC ranging unit 403, refer to related descriptions of the TDC ranging system shown in FIG. 2 and the ADC ranging system shown in FIG. 3. Details are not described again in this embodiment of this application.

The ranging method provided in the embodiments of this application may be applied to a plurality of different scenarios such as LiDAR ranging, infrared ranging, and ultrasonic ranging. The LiDAR ranging is a technology in which a laser beam is emitted as a detection signal, and a received echo signal that is reflected from an obstacle is compared with the transmitted detection signal, to obtain information about a target object, for example, parameters such as a target distance, an azimuth, a height, a speed, a posture, and even a shape. The LiDAR has high measurement accuracy and fine temporal and spatial resolution, and can implement functions such as ranging, target detection, tracking, and imaging recognition. In the ultrasonic ranging, an ultrasonic transmitting apparatus sends an ultrasonic wave as a detection signal, and a distance between a transmitting point and a target object is calculated based on a time difference when a receiver receives the ultrasonic wave. The ultrasonic wave has strong directivity, slow energy consumption, and a long propagation distance in a medium. Therefore, the ultrasonic ranging is quick, convenient, simple to calculate, can implement real-time control, and has measurement accuracy that can meet requirements of industrial application. The infrared ranging, also referred to as "infrared photoelectric ranging", is a phase-type photoelectric ranging technology that uses infrared light as a light source. A ranging range of the infrared ranging is relatively short, mostly within 5 km. The infrared ranging technology has advantages of a small volume, low weight, a simple operation, a high ranging speed, high accuracy, and the like because the light source of the infrared ranging technology is a semiconductor, an electronic circuit thereof is gradually integrated, and a ranging process is automatic.

Figure 6:
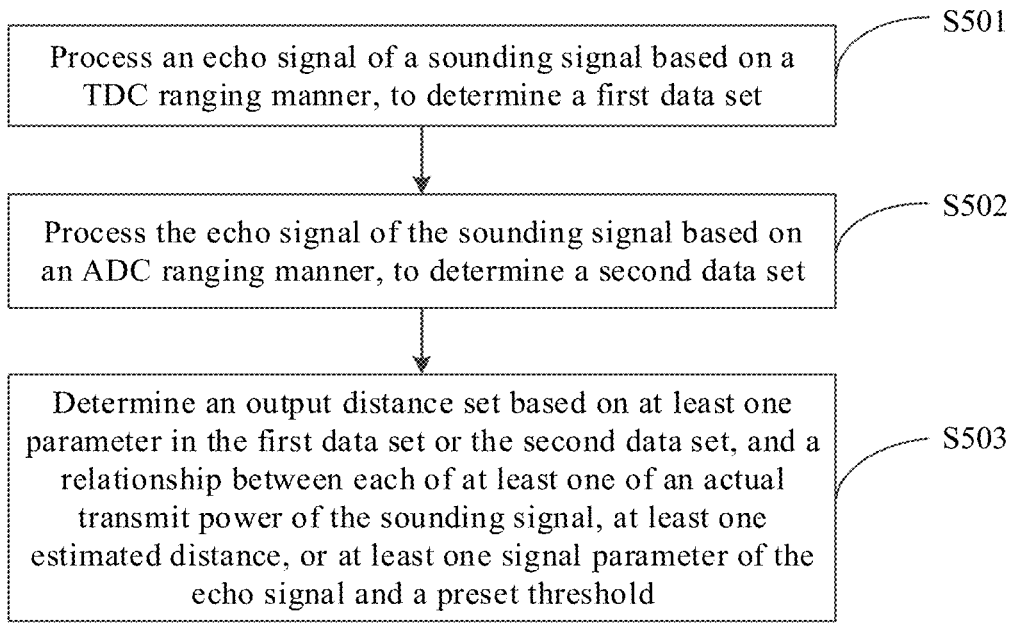
FIG. 6 is a first schematic flowchart of a ranging method based on a detection signal according to an embodiment of this application.

FIG. 6 is a schematic flowchart of a ranging method based on a detection signal according to an embodiment of this application. The method may be applied to the ranging system shown in FIG. 4 or FIG. 5. Referring to FIG. 6, the method includes the following steps.

S501: Process an echo signal of a detection signal based on a TDC ranging manner, to determine a first data set. The first data set includes the following parameter: at least one first distance or at least one first time of flight.

When the ranging system receives an echo signal that is formed when a detection signal transmitted by the ranging system is reflected by an obstacle such as a target object, fog, or dust, a series of processing operations such as time discrimination and analog-to-digital conversion processing may be performed on the echo signal based on the TDC ranging manner, to determine the first data set. The first data set is a data set indicating a distance between the ranging system and at least one obstacle (for example, one or more target objects). The first data set may include one or more first distances, or the first data set includes one or more first times of flight. The first time of flight may represent a time of flight in which a light pulse transmitted by the ranging system is reflected by an obstacle, and then returns to the ranging system. According to a conversion formula between a time of flight and a distance, a distance between the ranging system and the obstacle can be calculated. To be specific, one distance can be obtained through calculation based on one first time of flight. Therefore, at least one distance (which is referred to as at least one third distance below for ease of description) can be obtained through calculation based on the at least one first time of flight.

It should be noted that a process of determining the first data set according to S501 may be specifically implemented by the TDC ranging unit 402. For a detailed implementation process, refer to related descriptions of the TDC ranging system shown in FIG. 3. Details are not described in this embodiment of this application.

S502: Process the echo signal of the detection signal based on an ADC ranging manner, to determine a second data set. The second data set includes the following parameter: at least one second distance or at least one second time of flight. S501 and S502 may be performed in any sequence. In FIG. 6, an example in which S502 is after S501 is used for description.

Specifically, when the ranging system receives the echo signal that is formed when the detection signal transmitted by the ranging system is reflected by the obstacle, the echo signal may be converted into a digital signal based on the ADC ranging manner, and a series of data processing and operations are performed on the digital signal, to determine the second data set. The second data set is also a data set indicating a distance between the ranging system and at least one obstacle (for example, one or more target objects). The second data set may include one or more second distances, or the second data set includes one or more second times of flight. Similarly, one distance can be obtained through calculation based on one second time of flight. Therefore, at least one distance (which is referred to as at least one fourth distance below for ease of description) can be obtained through calculation based on the at least one second time of flight.

It should be noted that a process of determining the second data set according to S502 may be specifically implemented by the ADC ranging unit 403. For a detailed implementation process, refer to related descriptions of the ADC ranging system shown in FIG. 3. Details are not described in this embodiment of this application.

S503: Determine an output distance set based on at least one parameter in the first data set or the second data set, and a relationship between each of at least one of an actual transmit power of the detection signal, at least one estimated distance, or at least one signal parameter of the echo signal and a preset threshold. In other words, it means that determining an output distance set based on at least one parameter in the first data set or the second data set, and one or more of the following relationships:

a relationship between at least one of an actual transmit power of the detection signal and a preset power threshold;

a relationship between at least one estimated distance and a preset distance threshold; or a relationship between at least one signal parameter of the echo signal and a preset parameter threshold.

The determining an output distance set based on at least one parameter in the first data set or the second data set may include at least one of the following methods: determining the at least one first distance in the first data set as the output distance set; separately calculating at least one third distance based on the at least one first time of flight in the first data set, and determining the at least one third distance as the output distance set; determining the at least one second distance in the second data set as the output distance set; or separately calculating at least one fourth distance based on the at least one second time of flight in the second data set, and determining the at least one fourth distance as the output distance set.

Various ranging manners have advantages and limitations. For example, the TDC ranging manner has higher ranging accuracy in a short range, and the ADC ranging manner can improve performance of an echo with a low signal-to-noise ratio. Therefore, in this embodiment of this application, based on advantages and disadvantages of the two ranging manners, from distance sets obtained in different ranging manners, a data set with highest accuracy may be selected as a final output distance set of the target object, thereby improving ranging performance and ranging accuracy of the ranging system. In addition, the data set with the highest accuracy herein may be a ranging result that has highest or relatively high ranging accuracy or a relatively small measurement error and that is of a distance between the ranging system and the at least one target object, that is, a ranging result closest to an actual distance between the ranging system and the at least one target object.

Further, in S503, the determining an output distance set based on at least one parameter in the first data set or the second data set, and a relationship between each of at least one of an actual transmit power of the detection signal, at least one estimated distance, or at least one signal parameter of the echo signal and a preset threshold may specifically include the following several different manners, which are separately described in detail below.

In a first manner, the output distance set is determined based on the at least one parameter in the first data set or the second data set, and a relationship between the actual transmit power of the detection signal and a preset power threshold. When the actual transmit power P is greater than or equal to the preset power threshold P0, the first data set is determined as the output distance set. When the actual transmit power P is less than the preset power threshold P0, the second data set is determined as the output distance set.

When the actual transmit power of the detection signal is controlled by the control unit 401 shown in FIG. 4, the actual transmit power may be directly obtained by the control unit 401 shown in FIG. 4. Alternatively, when the actual transmit power of the detection signal is controlled by another unit (for example, a unit that transmits the detection signal) of the ranging system, the control unit 401 may obtain the actual transmit power of the detection signal by communicating with the unit that controls the actual transmit power.

In addition, the preset power threshold may be set in advance, and a specific value of the preset power threshold may be set by a person skilled in the art based on experience, or may be specifically set by a person skilled in the art with reference to ranging performance of various ranging manners and an attenuation degree of the used detection signal. A specific value and a detailed setting manner of the preset power threshold are not specifically limited in this application.

Specifically, when the actual transmit power P is greater than or equal to the preset power threshold P0, usually, a signal-to-noise ratio of the echo signal received by the ranging system is relatively high. In this case, accuracy of a ranging result corresponding to the TDC ranging manner is higher. Therefore, the first data set corresponding to the TDC ranging manner may be determined as the output distance set. When the actual transmit power P is less than the preset power threshold P0, usually, a signal-to-noise ratio of the echo signal received by the ranging system is relatively low. In this case, the ADC ranging manner can improve the signal-to-noise ratio of the echo signal, so that accuracy of a ranging result corresponding to the ADC ranging manner is higher. Therefore, the second data set corresponding to the ADC ranging manner may be determined as the output distance set.

It should be noted that when the actual transmit power P is equal to the preset power threshold P0, the second data set may alternatively be determined as the output distance set. In this embodiment of this application, only an example in which the first data set is determined as the output distance set in this case is used for description.

In a second manner, the output distance set is determined based on the at least one parameter in the first data set or the second data set, and a relationship between the at least one estimated distance and a preset distance threshold, and this includes at least one of the following: when determining that the at least one estimated distance is less than or equal to the preset distance threshold L0, determining the first data set as the output distance set; or when determining that the at least one estimated distance is greater than the preset distance threshold L0, determining the second data set as the output distance set.

The at least one estimated distance may be estimated by the ranging system according to a specific distance estimation method. Alternatively, the at least one estimated distance is determined by the ranging system based on at least one parameter set in the first data set or the second data set. For example, the at least one estimated distance may be the at least one first distance or the at least one second distance, or the at least one estimated distance may be an average value of distances corresponding to a same target object in the at least one first distance and the at least one second distance, or the like.

In addition, the preset distance threshold may be set in advance, and a specific value of the preset distance threshold may be set by a person skilled in the art based on experience, or may be specifically set with reference to ranging ranges of various ranging manners and detection performance of the used detection signal. A specific value and a detailed setting manner of the preset distance threshold are not specifically limited in this application.

Specifically, when the at least one estimated distance is less than or equal to the preset distance threshold L0, the time of flight of the detection signal transmitted by the ranging system is relatively short, and therefore, a manner with relatively high precision of measuring the time of flight needs to be used for implementation. In this case, accuracy of a ranging result corresponding to the TDC ranging manner is higher. Therefore, the first data set corresponding to the TDC ranging manner may be determined as the output distance set. When the at least one estimated distance is greater than the preset distance threshold L0, an attenuation degree of the detection signal transmitted by the ranging system is relatively high, and therefore, a signal-to-noise ratio of the echo signal formed by reflecting the detection signal is relatively low. In this case, accuracy of a ranging result corresponding to the ADC ranging manner is higher. Therefore, the second data set corresponding to the ADC ranging manner may be determined as the output distance set.

It should be noted that when the at least one estimated distance is equal to the preset distance threshold L0, the second data set may alternatively be determined as the output distance set. In this embodiment of this application, only an example in which the first data set is determined as the output distance set in this case is used for description.

Further, the at least one estimated distance is in a one-to-one correspondence with the parameter in the first data set, and is in a one-to-one correspondence with the parameter in the second data set. The determining the output distance set based on the at least one parameter in the first data set or the second data set, and a relationship between the at least one estimated distance and a preset distance threshold further includes: determining at least one first estimated distance and at least one second estimated distance in the at least one estimated distance, where the at least one estimated distance is less than or equal to the preset distance threshold, and the at least one second estimated distance is greater than the preset distance threshold; and determining a parameter that is in the first data set and that corresponds to the at least one first estimated distance and a parameter that is in the second data set and that corresponds to the at least one second estimated distance as the output distance set.

It can be learned from the analysis of the TDC ranging manner and the ADC ranging manner that when the at least one first estimated distance in the at least one estimated distance is less than or equal to the preset distance threshold L0, and the at least one second estimated distance in the at least one estimated distance is greater than the preset distance threshold, to obtain a ranging result with higher accuracy, the parameter that is in the first data set and that corresponds to the at least one first estimated distance and the parameter that is in the second data set and that corresponds to the at least one second estimated distance may be determined as the output distance set.

In a third manner, the output distance set is determined based on the at least one parameter in the first data set or the second data set, a relationship between the actual transmit power of the detection signal and a preset power threshold, and a relationship between the at least one estimated distance and a preset distance threshold, and this includes at least one of the following: when determining that the actual transmit power is greater than or equal to the preset power threshold, determining the first data set as the output distance set; when determining that the actual transmit power P is less than the preset power threshold P0 and determining that the at least one estimated distance is less than or equal to the preset distance threshold L0, determining the first data set as the output distance set; or when determining that the actual transmit power P is greater than the preset power threshold P0 and determining that the at least one estimated distance is greater than the preset distance threshold L0, determining the second data set as the output distance set.

When determining is performed based on the relationship between the actual transmit power of the detection signal and the preset power threshold and the relationship between the at least one estimated distance and the preset distance threshold, details may include: first determining the relationship between the actual transmit power and the preset power threshold, and then determining the relationship between the at least one estimated distance and the preset distance threshold; or first determining the relationship between the at least one estimated distance and the preset distance threshold, and then determining the relationship between the actual transmit power and the preset power threshold. This is not specifically limited in this embodiment of this application.

Specifically, when the actual transmit power P of the detection signal is relatively low and the at least one estimated distance is relatively short, because the TDC ranging manner has relatively high accuracy in a relatively short ranging range, that is, accuracy of a ranging result in the TDC ranging manner is higher in this case, the first data set corresponding to the TDC ranging manner may be determined as the output distance set. When the actual transmit power P of the detection signal is relatively low, but the at least one estimated distance is relatively long, an attenuation degree of the detection signal transmitted by the ranging system is relatively high, and therefore, a signal-to-noise ratio of the echo signal formed by reflecting the detection signal is relatively low. The ADC ranging manner can improve performance in the low signal-to-noise ratio, that is, accuracy of a ranging result in the ADC ranging manner is higher. Therefore, the second data set corresponding to the ADC ranging manner may be determined as the output distance set.

It should be noted that when the actual transmit power P is less than the preset power threshold P0, and the at least one estimated distance is equal to the preset distance threshold L0, the second data set may alternatively be determined as the output distance set. In this embodiment of this application, only an example in which the first data set is determined as the output distance set in this case is used for description.

In addition, the actual transmit power P and the preset power threshold P0 in the third manner are consistent with the actual transmit power P and the preset power threshold P0 in the first manner. The at least one estimated distance and the preset distance threshold L0 in the third manner are consistent with the at least one estimated distance and the preset distance threshold L0 in the second manner. For specific descriptions, refer to related descriptions in the first manner and the second manner. Details are not described again in this embodiment of this application.

In a fourth manner, the output distance set is determined based on the at least one parameter in the first data set or the second data set, and a relationship between the at least one signal parameter of the echo signal and a preset parameter threshold, and this includes at least one of the following: when determining that the at least one signal parameter is greater than or equal to the preset parameter threshold, determining the first data set as the output distance set; or when determining that the at least one signal parameter is less than the preset parameter threshold, determining the second data set as the output distance set.

The at least one signal parameter may include any one of the following parameters: an amplitude, energy, or a signal-to-noise ratio. In other words, the at least one signal parameter of the echo signal may include at least one amplitude, at least one piece of energy, at least one signal-to-noise ratio, or the like. The at least one signal parameter may be obtained by processing the echo signal by the TDC ranging unit 402 or the ADC ranging unit 403 shown in FIG. 4.

Specifically, when the at least one amplitude of the echo signal is greater than or equal to a preset amplitude threshold, the at least one piece of energy of the echo signal is greater than or equal to a preset energy threshold, or the at least one signal-to-noise ratio of the echo signal is greater than or equal to a preset signal-to-noise ratio threshold, an overall signal-to-noise ratio of the echo signal of the ranging system is relatively high. In this case, accuracy of a ranging result corresponding to the TDC ranging manner is higher. Therefore, the first data set may be determined as the output distance set. Alternatively, when the at least one amplitude of the echo signal is less than a preset amplitude threshold, the at least one piece of energy of the echo signal is less than a preset energy threshold, or the at least one signal-to-noise ratio of the echo signal is less than a preset signal-to-noise ratio threshold, an overall signal-to-noise ratio of the echo signal of the ranging system is relatively low. In this case, the ADC ranging manner can improve the signal-to-noise ratio of the echo signal. Therefore, the second data set may be determined as the output distance set.

For example, a second distance in the second data set is D, an amplitude of a corresponding echo signal is A, and a preset amplitude threshold is A0. If A≥A0, the first data set may be determined as the output distance set within a range of [D−ΔD1, D+ΔD1], or the second data set may be determined as the output distance set within a range other than the range of [D−ΔD1, D+ΔD1]. ΔD1 may be set in advance.

It should be noted that when a data set with highest accuracy in the first data set and the second data set is determined as the output distance set based on the relationship between the signal parameter of the echo signal and the preset parameter threshold, determining and selection may be performed based on only one, or two, or three of the amplitude, the energy, or the signal-to-noise ratio of the echo signal. The foregoing uses only one type of signal parameter as an example for description.

In addition, the preset amplitude threshold, the preset energy threshold, and the preset signal-to-noise ratio threshold may be set by a person skilled in the art based on experience, or may be specifically determined based on performance of the ranging system. This is not specifically limited in this application. In addition, when the signal parameter of the echo signal is equal to the preset parameter threshold, the second data set may alternatively be determined as the output distance set. In this embodiment of this application, only an example in which the first data set is determined as the output distance set in this case is used for description.

Further, the at least one signal parameter is in a one-to-one correspondence with the parameter in the first data set, and is in a one-to-one correspondence with the parameter in the second data set. The determining the output distance set based on the at least one parameter in the first data set or the second data set, and a relationship between the at least one signal parameter of the echo signal and a preset parameter threshold may further include: determining at least one first signal parameter and at least one second signal parameter in the at least one signal parameter, where the at least one first signal parameter is less than or equal to the preset parameter threshold, and the at least one second signal parameter is greater than the preset parameter threshold; and determining a parameter that is in the first data set and that corresponds to the at least one first signal parameter and a parameter that is in the second data set and that corresponds to the at least one second signal parameter as the output distance set.

It can be learned from the analysis of the TDC ranging manner and the ADC ranging manner that when the at least one first signal parameter in the at least one signal parameter is less than or equal to the preset parameter threshold, and the at least one second signal parameter in the at least one signal parameter is greater than the preset parameter threshold, to obtain a ranging result with higher accuracy, the parameter that is in the first data set and that corresponds to the at least one first signal parameter and the parameter that is in the second data set and that corresponds to the at least one second signal parameter may be determined as the output distance set.

In another possible implementation, at least one first signal parameter and at least one second signal parameter in the at least one signal parameter are determined. Both the at least one first signal parameter and the at least one second signal parameter are greater than the preset parameter threshold, and a data difference between two parameters that are in the second data set and that respectively correspond to the at least one first signal parameter and the at least one second signal parameter is less than or equal to a data difference threshold (for example, a distance difference between two second distances is less than a distance difference threshold, or a time different between two second times of flight is less than a time difference threshold). In this case, two pieces of data that are in the first data set and that respectively correspond to the at least one first signal parameter and the at least one second signal parameter in the second data set are determined as the output distance set.

For example, at least two second distances included in the second data set are respectively represented as L3 and L4, amplitudes of echo signals corresponding to the two second distances L3 and L4 are respectively A3 and A4, a preset amplitude threshold is A0, and a preset distance difference threshold is D0. When the amplitude A3 is greater than or equal to A0 (that is, $A3 \geq A0$), the amplitude A3 is greater than or equal to A0 (that is, $A4 \geq A0$), and a difference D between the second distance L3 and the second distance L4 is less than or equal to the preset distance difference threshold D0 (that is, $|L3-L4| \leq D0$), L3 and L4 that are in the second data set corresponding to the ADC ranging manner are determined as the output distance set.

Figure 7:
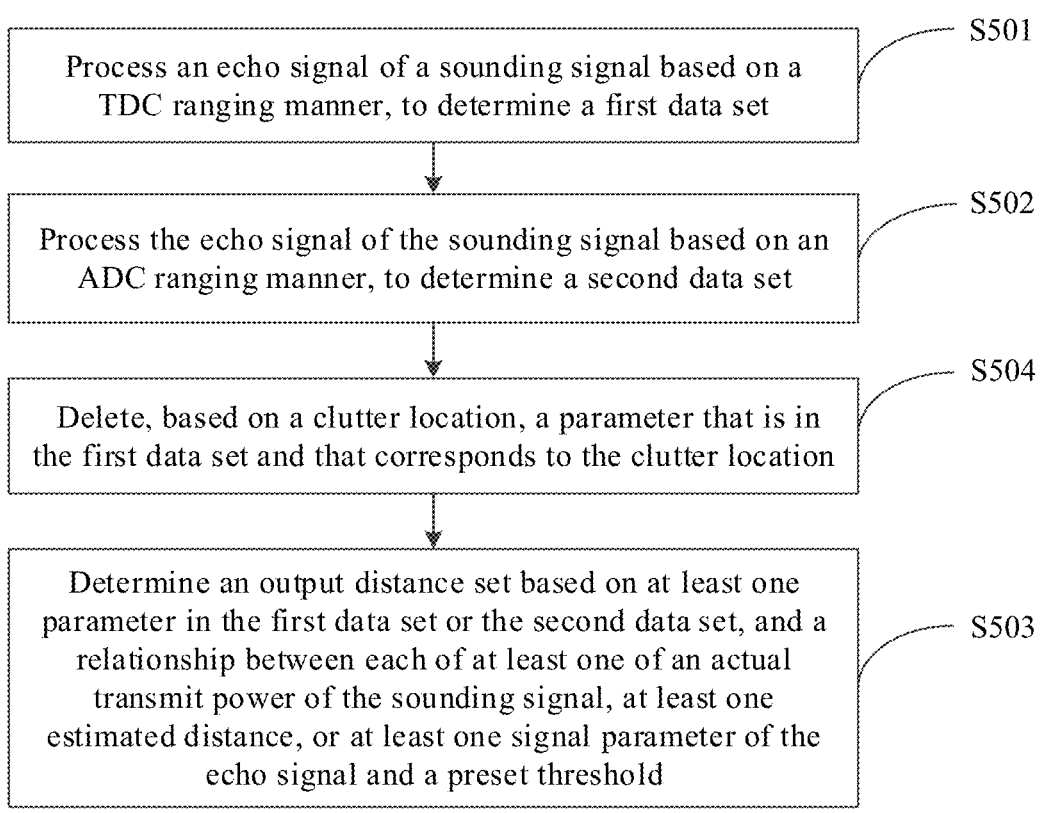
FIG. 7 is a second schematic flowchart of a ranging method based on a detection signal according to an embodiment of this application.

Further, referring to FIG. 7, the second data set further includes a clutter location. Before S503, the method further includes S504.

S504: Delete, based on the clutter location, a parameter that is in the first data set and that corresponds to the clutter location.

A clutter may be an echo signal formed after the detection signal is reflected or scattered by an object that is not expected to be detected (namely, an obstacle other than the target object). For example, the clutter may be an echo signal formed by reflecting the detection signal by fog, dust, raindrops, or swarms of flying insects. Because the clutter does not indicate a distance between the target object and the ranging system, a first distance corresponding to the clutter location needs to be deleted from the output data set, or a first time of flight corresponding to the clutter location needs to be deleted from the output data set. This improves ranging performance and accuracy of the ranging system.

Specifically, the ADC ranging unit 403 may obtain complete echo information and identify a clutter and a valid echo signal by sampling an entire echo signal. However, the TDC ranging unit 402 usually cannot identify a clutter location, or needs to use an additional hardware design to identify a clutter location. Therefore, screening may be performed on the first data set based on the clutter location included in the second data set, that is, a first distance or a first time of flight that is in the first data set and that corresponds to the clutter location is deleted.

Figure 8:
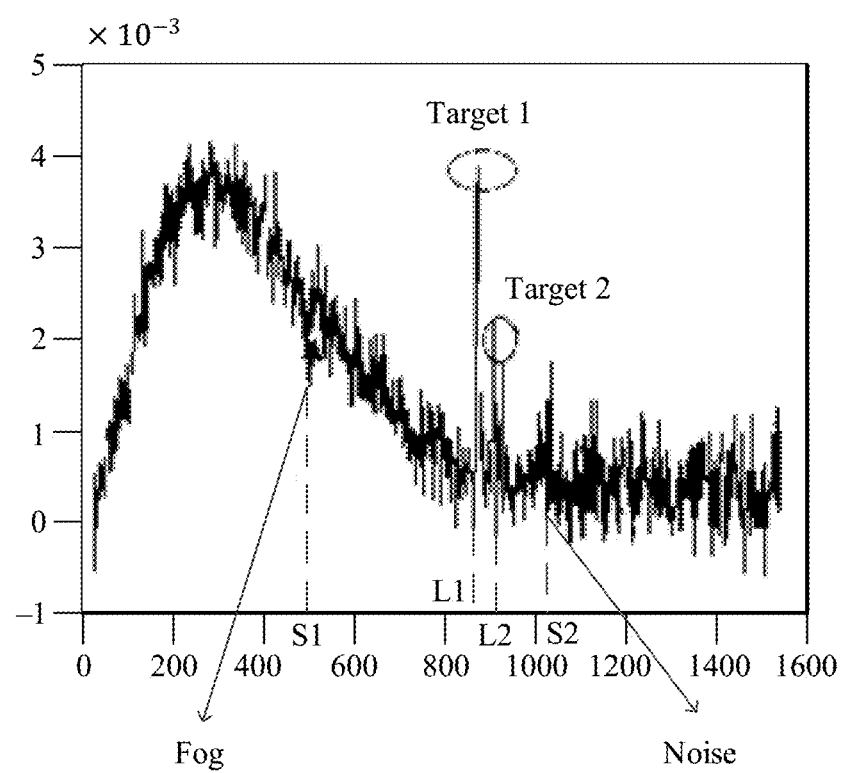
FIG. 8 is a waveform diagram obtained after an ADC ranging unit samples an echo signal according to an embodiment of this application.

For example, it is assumed that a waveform diagram obtained after the ADC ranging unit 403 samples an echo signal is shown in FIG. 8, and locations corresponding to a target 1 and a target 2 circled in FIG. 8 represent locations L1 and L2 corresponding to target objects. A location indicated by an arrow represents location information corresponding to a clutter. For example, a distance value S1 is a location corresponding to fog, and a distance value S2 is a location of noise. If the location information of the clutter is also determined as a target distance and is output, ranging performance and accuracy of the ranging system are greatly affected. The first distance or the first time of flight that is in the first data set and that corresponds to the clutter location is deleted in S504. This can reduce a ranging error caused by a clutter in the TDC ranging manner, improve accuracy of the output distance set, and further improve ranging performance of the ranging system.

Figure 9:
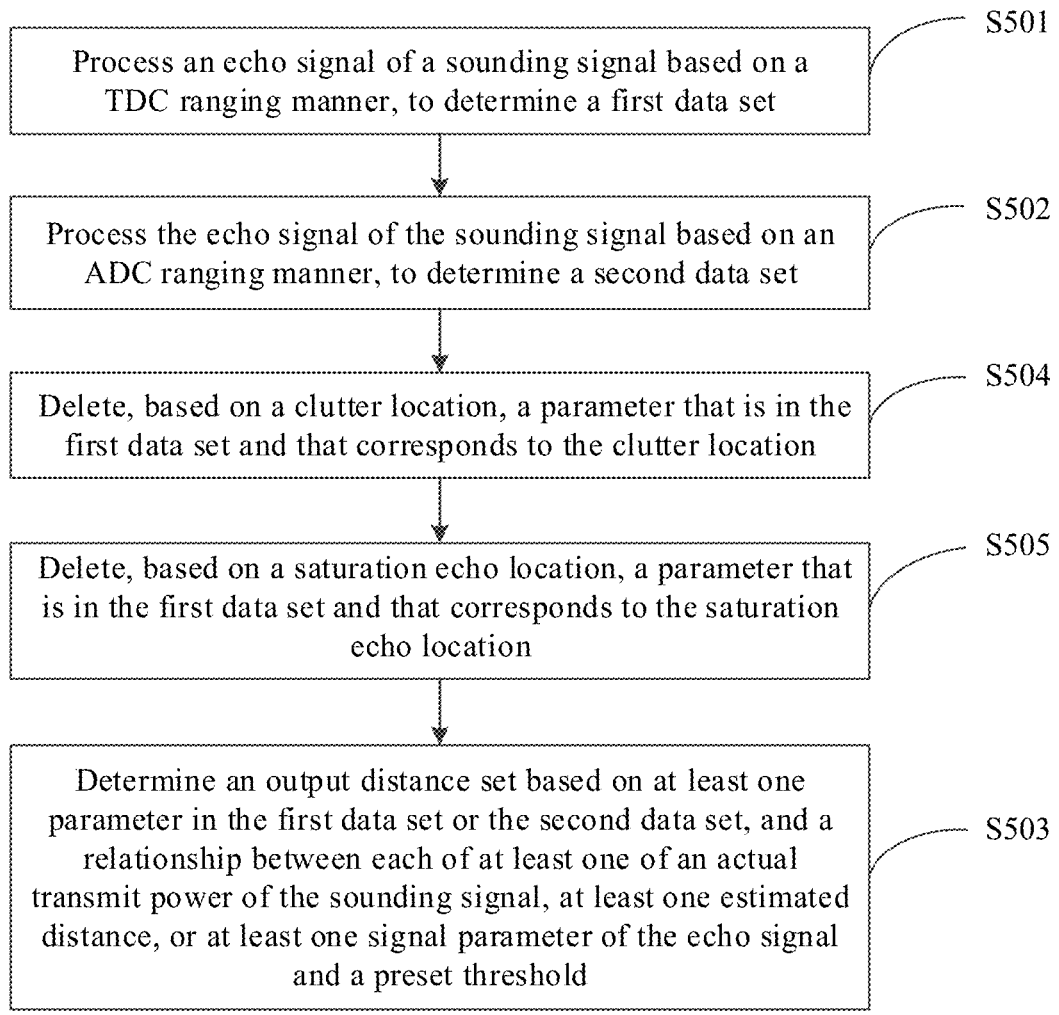
FIG. 9 is a third schematic flowchart of a ranging method based on a detection signal according to an embodiment of this application.

Further, referring to FIG. 9, the second data set further includes a saturation echo location. Before S503, the method further includes S505. S505 and S504 may be performed in any sequence. In FIG. 9, an example in which S505 is after S504 is used for description.

S505: Delete, based on the saturation echo location, a parameter that is in the first data set and that corresponds to the saturation echo location.

A saturation echo may be an echo signal whose actual waveform is outside a pre-quantized waveform range. For example, an echo signal generated at a relatively short distance is outside a preset amplitude range of the echo signal because an amplitude of the echo signal is excessively large. This is a case of the saturation echo.

Specifically, because the ADC ranging unit 403 may obtain complete echo information by sampling an entire echo signal, the saturation echo location can be accurately identified. The TDC ranging unit 402 usually cannot identify the saturation echo location, or needs to use an additional hardware design to identify the saturation echo location. Therefore, screening may be performed on the first data set based on the saturation echo location included in the second data set, that is, a first distance or a first time of flight that is in the first data set and that corresponds to the saturation echo location is deleted.

In this embodiment of this application, the first distance or the first time of flight that is in the first data set and that corresponds to the saturation echo location is deleted. This can reduce a ranging error caused by a saturation echo in the TDC ranging manner, improve accuracy of the output distance set, and further improve ranging performance of the ranging system.

An embodiment of this application further provides a ranging apparatus based on a detection signal. A signal formed by reflecting a detection signal transmitted by the ranging apparatus is an echo signal. The ranging apparatus may be shown in FIG. 4 or FIG. 5, and the ranging apparatus may include: a control unit 401, a TDC ranging unit 402, and an ADC ranging unit 403.

In this embodiment of this application, the TDC ranging unit 402 is configured to process the echo signal based on a TDC ranging manner, to determine a first data set. The first data set includes the following parameter: at least one first distance or at least one first time of flight.

The ADC ranging unit 403 is configured to process the echo signal in an ADC ranging manner, to determine a second data set. The second data set includes the following parameter: at least one second distance or at least one second time of flight.

The control unit 401 is configured to determine an output distance set based on at least one parameter in the first data set or the second data set, and a relationship between each of at least one of an actual transmit power of the detection signal, at least one estimated distance, or at least one signal parameter of the echo signal and a preset threshold.

Further, the control unit 401 is specifically configured to perform at least one of the following steps: determining the at least one first distance as the output distance set; separately calculating at least one third distance based on the at least one first time of flight, and determining the at least one third distance as the output distance set; determining the at least one second distance as the output distance set; or separately calculating at least one fourth distance based on the at least one second time of flight, and determining the at least one fourth distance as the output distance set.

In a possible implementation, the control unit 401 is specifically configured to: when determining that the actual transmit power is greater than or equal to a preset power threshold, determine the first data set as the output distance set; or when determining that the actual transmit power is less than a preset power threshold, determine the second data set as the output distance set.

Optionally, the control unit 401 is further specifically configured to: when determining that the actual transmit power is greater than or equal to a preset power threshold, determine the first data set as the output distance set; after determining that the actual transmit power is less than a preset power threshold, when determining that the at least one estimated distance is less than or equal to a preset distance threshold, determine the first data set as the output distance set; or after determining that the actual transmit power is less than a preset power threshold, when determining that the at least one estimated distance is greater than a preset distance threshold, determine the second data set as the output distance set.

In another possible implementation, the control unit 401 is specifically configured to: when determining that the at least one estimated distance is less than or equal to a preset distance threshold, determine the first data set as the output distance set; or when determining that the at least one estimated distance is greater than a preset distance threshold, determine the second data set as the output distance set.

Optionally, the control unit 401 is further specifically configured to: after determining that the at least one estimated distance is less than or equal to a preset distance threshold, when determining that the actual transmit power of the detection signal is less than a preset power threshold, determine the first data set as the output distance set; or after determining that the at least one estimated distance is greater than a preset distance threshold, when determining that the actual transmit power of the detection signal is less than a preset power threshold, determine the second data set as the output distance set.

Further, the at least one estimated distance is in a one-to-one correspondence with the parameter in the first data set, and is in a one-to-one correspondence with the parameter in the second data set. The control unit 401 is further specifically configured to: determine at least one first estimated distance and at least one second estimated distance in the at least one estimated distance, where the at least one estimated distance is less than or equal to a preset distance threshold, and the at least one second estimated distance is greater than the preset distance threshold; and determine a parameter that is in the first data set and that corresponds to the at least one first estimated distance and a parameter that is in the second data set and that corresponds to the at least one second estimated distance as the output distance set.

In another possible implementation, the at least one signal parameter is any one of the following parameters: an amplitude, energy, or a signal-to-noise ratio. The control unit 401 is specifically configured to: when determining that the at least one signal parameter is less than or equal to a preset parameter threshold, determine the first data set as the output distance set; or when determining that the at least one signal parameter is greater than a preset parameter threshold, determine the second data set as the output distance set.

Optionally, the control unit 401 is further specifically configured to: determine at least one first signal parameter and at least one second signal parameter in the at least one signal parameter, where the at least one first signal parameter is less than or equal to a preset parameter threshold, and the at least one second signal parameter is greater than the preset parameter threshold; and determine a parameter that is in the first data set and that corresponds to the at least one first signal parameter and a parameter that is in the second data set and that corresponds to the at least one second signal parameter as the output distance set.

Alternatively, the control unit 401 is further specifically configured to: determine at least one first signal parameter and at least one second signal parameter in the at least one signal parameter, where the at least one first signal parameter and the at least one second signal parameter are greater than a preset parameter threshold, and a data difference between two parameters that are in the second data set and that respectively correspond to the at least one first signal parameter and the at least one second signal parameter is less than or equal to a data difference threshold; and determine a parameter that is in the first data set and that corresponds to the at least one first signal parameter and a parameter that is in the second data set and that corresponds to the at least one second signal parameter as the output distance set.

In another possible implementation, the second data set further includes a clutter location. The control unit 401 is further configured to delete, based on the clutter location, a parameter that is in the first data set and that corresponds to the clutter location. Alternatively, the second data set further includes a saturation echo location. The control unit 401 is further configured to delete, based on the saturation echo location, a parameter that is in the first data set and that corresponds to the saturation echo location.

It should be noted that for specific descriptions of the control unit 401, the TDC ranging unit 402, and the ADC ranging unit 403, refer to related descriptions in the foregoing method embodiments. Details are not described again in this embodiment of this application.

In another embodiment of this application, the control unit 401 is further configured to enable or disable the TDC ranging unit 402 and the ADC ranging unit 403. The following separately uses three possible implementations as examples to describe a specific process in which the control unit 401 enables or disables the TDC ranging unit 402 and the ADC ranging unit 403.

In a first implementation, the control unit 401 determines, based on a relationship between the actual transmit power of the detection signal and a preset power threshold, whether to enable the TDC ranging unit 402 or the ADC ranging unit 403. Specifically, when the actual transmit power P is less than the preset power threshold P1, the control unit 401 may enable the ADC ranging unit 403. In this case, the control unit 401 may disable the TDC ranging unit 402. When the actual transmit power P is greater than or equal to the preset power threshold P1, the control unit 401 may enable the TDC ranging unit 402. In this case, the control unit 401 may disable the ADC ranging unit 403.

In a second implementation, the control unit 401 determines, based on a relationship between the at least one estimated distance and a preset distance threshold, whether to enable the TDC ranging unit 402 or the ADC ranging unit 403. Specifically, when the at least one estimated distance is less than or equal to the preset distance threshold L1, the control unit 401 may enable the TDC ranging unit 402. In this case, the control unit 401 may disable the ADC ranging unit 403. When the at least one estimated distance is greater than the preset distance threshold L1, the control unit 401 may enable the ADC ranging unit 403. In this case, the control unit 401 may disable the TDC ranging unit 402.

In the foregoing two implementations, when the actual transmit power is relatively low or the at least one estimated distance is relatively long, the control unit 401 enables the ADC ranging unit 403 with higher ranging performance. When the actual transmit power is relatively high or the at least one estimated distance is relatively short, the control unit 401 enables the TDC ranging unit 402 with higher ranging performance. This can improve accuracy of the final output distance set, and reduce energy consumption of the ranging apparatus.

In a third implementation, the control unit 401 is further configured to: when determining that the ADC ranging unit 403 is faulty, enable the TDC ranging unit 402; or when determining that the TDC ranging unit 402 is faulty, enable the ADC ranging unit 403.

Specifically, an implementation in which the control unit 401 determines whether the TDC ranging unit 402 and the ADC ranging unit 403 are faulty may include: based on a difference between the first data set that is output by the TDC ranging unit 402 and the second data set that is output by the ADC ranging unit 403, determining whether the TDC ranging unit 402 and the ADC ranging unit 403 are in a normal working state, to disable a faulty ranging unit.

For example, for a specific time of ranging, if the control unit 401 learns through comparison that a difference between a ranging result of the TDC ranging unit 402 and a ranging result of the ADC ranging unit 403 is relatively large, the control unit 401 starts, from this time of ranging, comparing ranging results of the TDC ranging unit 402 and the ADC ranging unit 403 a plurality of times such as 20 times. If a difference between distances measured by the TDC ranging unit 402 and the ADC ranging unit 403 is greater than a preset distance difference (or a time-of-flight difference is greater than a preset time difference), and a probability that the distance difference is greater than the preset distance difference is greater than a preset distance difference probability (or a probability that the time-of-flight difference is greater than the preset time difference is greater than a preset time difference probability), for example, 90%, the control unit 401 may determine whether a current echo signal is in a multi-echo case. If the current echo signal is in the multi-echo case, the control unit 401 may determine that the TDC ranging unit 402 and the ADC ranging unit 403 are currently in a normal working state. Alternatively, if the current echo signal is not in the multi-echo case, the control unit 401 may further determine and disable a faulty ranging unit, and may also send an abnormal alarm signal. The foregoing multi-echo case may be a case in which a plurality of echoes are generated in one ranging signal sending period.

Further, a process in which the control unit 401 determines the faulty ranging unit may be as follows: The control unit 401 specifically determines the faulty ranging unit based on a waveform of an entire echo sampled by the ADC ranging unit 403 in combination with ranging results of the two ranging manners. Specifically, whether echoes corresponding to at least one first distance in the first data set and at least one second distance in the second data set exist at corresponding original echo locations sampled by the ADC ranging unit 403 is determined. If the echo corresponding to the at least one first distance in the first data set cannot be found at the corresponding original echo location, the control unit 401 may determine that the TDC ranging unit 402 is faulty. Alternatively, if the echo corresponding to the at least one second distance in the second data set cannot be found at the corresponding original echo location, the control unit 401 may determine that the ADC ranging unit 403 is faulty. If both the echoes exist, the control unit 401 may cancel the alarm signal.

In this embodiment of this application, the control unit 401 determines a faulty ranging unit, and enables another ranging unit when a ranging unit is faulty. In this way, robustness of the ranging apparatus can be improved, and ranging performance of the ranging apparatus is further improved.

In another embodiment of this application, the control unit 401 is further configured to: configure a first measurement parameter of the TDC ranging unit 402, where the first measurement parameter may include a first distance or a first time of flight; and configure a second measurement parameter of the ADC ranging unit 402, where the second measurement parameter may include a second distance or a second time of flight.

Specifically, when the first measurement parameter configured by the control unit 401 is the first distance, the first data set obtained through measurement by the TDC ranging unit 402 includes at least one first distance, or when the first measurement parameter configured by the control unit 401 is the first time of flight, the first data set obtained through measurement by the TDC ranging unit 402 includes at least one first time of flight. When the second measurement parameter configured by the control unit 401 is the second distance, the second data set obtained through measurement by the ADC ranging unit 403 includes at least one second distance, or when the second measurement parameter configured by the control unit 401 is the second time of flight, the second data set obtained through measurement by the ADC ranging unit 403 includes at least one second time of flight.

Further, the control unit 401 may further configure that the first measurement parameter includes at least one of the following parameters: an amplitude, energy, or a signal-to-noise ratio, and configure that the second measurement parameter includes at least one of the following parameters: an amplitude, energy, a signal-to-noise ratio, a clutter location, or a saturation echo location. To be specific, the control unit 401 may further configure that the first data set obtained by the TDC ranging unit 402 includes at least one of an amplitude of the echo signal, energy of the echo signal, or a signal-to-noise ratio of the echo signal, and configure that the second data set obtained through measurement by the ADC ranging unit 403 includes at least one of an amplitude of the echo signal, energy of the echo signal, a signal-to-noise ratio of the echo signal, a clutter location, or a saturation echo location.

In this embodiment of this application, the control unit 401 may configure, based on ranging requirements, corresponding measurement parameters for the TDC ranging unit 402 and the ADC ranging unit 403. This improves flexibility and diversity of the ranging system, and can improve comprehensive performance of the ranging apparatus.

Figure 10:
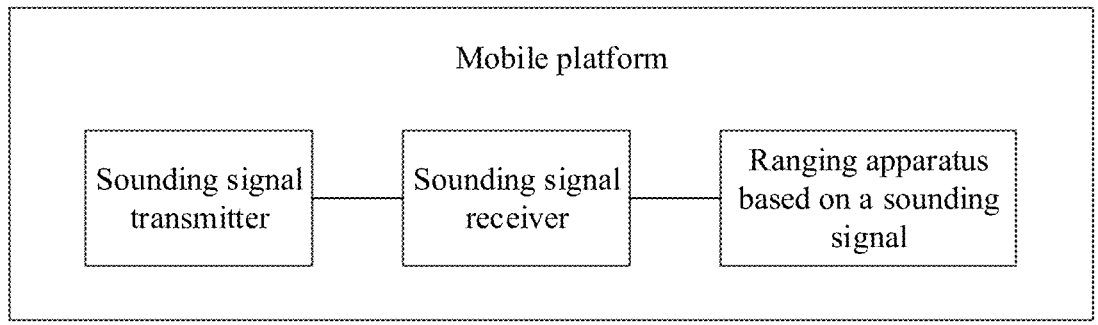
FIG. 10 is a schematic structural diagram of a mobile platform according to an embodiment of this application.

FIG. 10 is a schematic structural diagram of a mobile platform according to an embodiment of this application. The mobile platform may include a detection signal transmitter, a detection signal receiver, and the ranging apparatus provided in any one of FIG. 3, FIG. 4, or FIG. 10. The detection signal transmitter is configured to transmit a detection signal, and may specifically include the laser drive, the laser, the scanning component, the transmit end, and the like shown in FIG. 2 or FIG. 3. The detection signal receiver is configured to receive an echo signal of the detection signal, and may specifically include the receive end, the detector, the trans-impedance amplifier, and the like shown in FIG. 2 or FIG. 3. The ranging apparatus is configured to perform related steps in the foregoing method embodiments.

In the several embodiments provided in this application, it should be understood that the disclosed method and apparatus may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one data processing unit, or each of the units may exist alone physically, or two or more units may be integrated into one unit. The integrated unit may be implemented in a form of hardware, or may be implemented in a form of hardware and a software function unit.

When the foregoing integrated unit is implemented in a form of a software function unit, the integrated unit may be stored in a computer-readable storage medium. The software function unit is stored in a storage medium and includes several instructions for enabling a computer device (which may be a personal computer, a server, a network device, or the like) to perform some steps of the methods in the embodiments of this application. The foregoing storage medium includes various media that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing descriptions are merely specific implementations of the embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A ranging method implemented by a ranging device, comprising:
   processing an echo signal formed by reflecting a detection signal, based on a time-to-digital conversion (TDC) ranging manner, to determine a first data set, wherein the first data set comprises at least one first distance or at least one first time of flight;
   processing the echo signal, based on an analog-to-digital conversion (ADC) ranging manner, to determine a second data set, wherein the second data set comprises at least one second distance or at least one second time of flight; and
   determining an output distance set based on at least one parameter in the first data set or the second data set, and one or more of following relationships:
   a relationship between at least one of an actual transmit power of the detection signal and a preset power threshold,
   a relationship between at least one estimated distance and a preset distance threshold, or
   a relationship between at least one signal parameter of the echo signal and a preset parameter threshold, wherein the at least one estimated distance is in a one-to-one correspondence with the at least one parameter in the first data set, and is in a one-to-one correspondence with the at least one parameter in the second data set, and the determining the output distance set comprises:

determining at least one first estimated distance and at least one second estimated distance in the at least one estimated distance, wherein the at least one first estimated distance is less than or equal to the preset distance threshold, and the at least one second estimate distance is greater than the preset distance threshold; and determining a parameter that is in the first data set and that corresponds to the at least one first estimated distance and a parameter that is in the second data set and that corresponds to the at least one second estimated distance as the output distance set.

2. The method according to claim 1, wherein the determining an output distance set comprises at least one of determining the at least one first distance as the output distance set;

separately calculating at least one third distance based on the at least one first time of flight, and determining the at least one third distance as the output distance set; determining the at least one second distance as the output distance set; or separately calculating at least one fourth distance based on the at least one second time of flight, and determining the at least one fourth distance as the output distance set.

3. The method according to claim 1, wherein the determining the output distance set comprises at least one of following:

when the actual transmit power is greater than or equal to the preset power threshold, determining the first data set as the output distance set; or when the actual transmit power is less than the preset power threshold, determining the second data set as the output distance set.

4. The method according to claim 1, wherein the determining the output distance set comprises at least one of following:

when the actual transmit power is greater than or equal to the preset power threshold, determining the first data set as the output distance set;

when the actual transmit power is less than the preset power threshold, and when the at least one estimated distance is less than or equal to the preset distance threshold, determining the first data set as the output distance set; or when the actual transmit power is less than the preset power threshold, and when the at least one estimated distance is greater than the preset distance threshold, determining the second data set as the output distance set.

5. The method according to claim 1, wherein the determining the output distance set comprises at least one of following:

when the at least one estimated distance is less than or equal to the preset distance threshold, determining the first data set as the output distance set; or when the at least one estimated distance is greater than the preset distance threshold, determining the second data set as the output distance set.

6. The method according to claim 1, wherein the determining the output distance set comprises at least one of following:

when the at least one estimated distance is less than or equal to the preset distance threshold, and when the actual transmit power of the detection signal is less than the preset power threshold, determining the first data set as the output distance set; or when the at least one estimated distance is greater than the preset distance threshold, and when the actual transmit power of the detection signal is less than the preset power threshold, determining the second data set as the output distance set.

7. The method according to claim 1, wherein the at least one signal parameter is any one of following parameters: an amplitude, energy, or a signal-to-noise ratio, and the determining the output distance set comprises at least one of following:

when the at least one signal parameter is greater than or equal to the preset parameter threshold, determining the first data set as the output distance set; or when the at least one signal parameter is less than the preset parameter threshold, determining the second data set as the output distance set.

8. The method according to claim 1, wherein the at least one signal parameter is any one of following parameters: an amplitude, energy, or a signal-to-noise ratio, the at least one signal parameter is in the one-to-one correspondence with the at least one parameter in the first data set, and is in the one-to-one correspondence with the at least one parameter in the second data set, and the determining the output distance set comprises:

determining at least one first signal parameter and at least one second signal parameter in the at least one signal parameter, wherein the at least one first signal parameter is less than or equal to the preset parameter threshold, and the at least one second signal parameter is greater than the preset parameter threshold; and determining the parameter that is in the first data set and that corresponds to the at least one first signal parameter and the parameter that is in the second data set and that corresponds to the at least one second signal parameter as the output distance set.

9. The method according to claim 1, wherein the at least one signal parameter comprises any one of following parameters: an amplitude, energy, or a signal-to-noise ratio, the at least one signal parameter is in the one-to-one correspondence with the at least one parameter in the first data set, and is in the one-to-one correspondence with the at least one parameter in the second data set, and the determining the output distance set comprises:

determining at least one first signal parameter and at least one second signal parameter in the at least one signal parameter, wherein both the at least one first signal parameter and the at least one second signal parameter are greater than the preset parameter threshold, and a data difference between two parameters that are in the second data set and that respectively correspond to the at least one first signal parameter and the at least one second signal parameter is less than or equal to a data difference threshold; and determining the parameter that is in the first data set and that corresponds to the at least one first signal parameter and the parameter that is in the second data set and that corresponds to the at least one second signal parameter as the output distance set.

10. The method according to claim 1, wherein the second data set further comprises a clutter location, and the method further comprises:

deleting, based on the clutter location, the parameter that is in the first data set and that corresponds to the clutter location.

11. The method according to claim 1, wherein the second data set further comprises a saturation echo location, and the method further comprises:

deleting, based on the saturation echo location, the parameter that is in the first data set and that corresponds to the saturation echo location.

12. An apparatus, comprising:
a non-transitory storage medium storing programming instructions; and
one or more processors coupled to the non-transitory storage medium, wherein the one or more processors are configured to execute the programming instructions to cause the apparatus to
process an echo signal formed by reflecting a detection signal, based on a TDC ranging manner, to determine a first data set, wherein the first data set comprises: at least one first distance or at least one first time of flight;
process the echo signal based on an ADC ranging manner, to determine a second data set, wherein the second data set comprises the following parameter at least one second distance or at least one second time of flight; and
determine an output distance set based on at least one parameter in the first data set or the second data set, and one or more of following relationships:
a relationship between at least one of an actual transmit power of the detection signal and a preset power threshold,
a relationship between at least one estimated distance and a preset distance threshold, or
a relationship between at least one signal parameter of the echo signal and a preset parameter threshold;
determine at least one first estimated distance and at least one second estimated distance in the at least one estimated distance, wherein the at least one first estimated distance is less than or equal to the preset distance threshold; and
determine a parameter that is in the first data set and that corresponds to the at least one first estimated distance and a parameter that is in the second data set and that corresponds to the at least one second estimated distance as the output distance set, wherein the at least one estimated distance is in one-to-one correspondence with the parameter in the first data set, and is in a one-to-one correspondence with the parameter in the second data set.

13. The apparatus according to claim 12, wherein the one or more processors are further configured to execute the programming instructions to cause the apparatus to:
determine the at least one first distance as the output distance set;
separately calculating at least one third distance based on the at least one first time of flight, and determining the at least one third distance as the output distance set;
determine the at least one second distance as the output distance set; or
separately calculate at least one fourth distance based on the at least one second time of flight, and determine the at least one fourth distance as the output distance set.

14. The apparatus according to claim 12, wherein the one or more processors are further configured to execute the programming instructions to cause the apparatus to:
when the actual transmit power is greater than or equal to the preset power threshold, determine the first data set as the output distance set; or
when the actual transmit power is less than the preset power threshold, determine the second data set as the output distance set.

15. The apparatus according to claim 12, wherein one or more processors are further configured to execute the programming instructions to cause the apparatus to:
when the actual transmit power is greater than or equal to the preset power threshold, determine the first data set as the output distance set;
when the actual transmit power is less than the preset power threshold, and when the at least one estimated distance is less than or equal to the preset distance threshold, determine the first data set as the output distance set; or
when the actual transmit power is less than the preset power threshold, and when the at least one estimated distance is greater than the preset distance threshold, determine the second data set as the output distance set.

16. The apparatus according to claim 12, wherein the one or more processors are further configured to execute the programming instructions to cause the apparatus to:
when the at least one estimated distance is less than or equal to the preset distance threshold, determine the first data set as the output distance set; or
when the at least one estimated distance is greater than the preset distance threshold, determine the second data set as the output distance set.

17. The apparatus according to claim 12, wherein the one or more processors are further configured to execute the programming instructions to cause the apparatus to:
when the at least one estimated distance is less than or equal to the preset distance threshold, and when the actual transmit power of the detection signal is less than the preset power threshold, determine the first data set as the output distance set; or
when the at least one estimated distance is greater than the preset distance threshold, and when the actual transmit power of the detection signal is less than the preset power threshold, determine the second data set as the output distance set.

18. The apparatus according to claim 12, wherein the one or more processors are further configured to execute the programming instructions to cause the apparatus to:
when the at least one signal parameter is less than or equal to the preset parameter threshold, determine the first data set as the output distance set; or
when the at least one signal parameter is greater than the preset parameter threshold, determine the second data set as the output distance set, wherein
the at least one signal parameter is any one of following parameters: an amplitude, energy, or a signal-to-noise ratio.

19. The method according to claim 5, wherein the at least one estimated distance is an average value of distances corresponding to a same target object in the at least one first distance and the at least one second distance.

\* \* \* \* \*